US010616910B2

(12) United States Patent
Xu et al.

(10) Patent No.: US 10,616,910 B2
(45) Date of Patent: Apr. 7, 2020

(54) UPLINK DATA TRANSMISSION METHOD AND APPARATUS

(71) Applicant: Huawei Technologies Co., Ltd., Shenzhen (CN)

(72) Inventors: Xiuqiang Xu, Shanghai (CN); Lei Wang, Shanghai (CN); Shunqing Zhang, Shenzhen (CN); Yan Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 5 days.

(21) Appl. No.: 15/693,907

(22) Filed: Sep. 1, 2017

(65) Prior Publication Data

US 2018/0014320 A1    Jan. 11, 2018

Related U.S. Application Data

(63) Continuation of application No. PCT/CN2015/073567, filed on Mar. 3, 2015.

(51) Int. Cl.
*H04W 72/00* (2009.01)
*H04W 72/12* (2009.01)
(Continued)

(52) U.S. Cl.
CPC ....... *H04W 72/1268* (2013.01); *H04L 5/0007* (2013.01); *H04W 72/005* (2013.01);
(Continued)

(58) Field of Classification Search
CPC ... H04L 5/0007; H04L 5/0016; H04L 5/0051; H04L 12/18; H04L 12/1845;
(Continued)

(56) References Cited

U.S. PATENT DOCUMENTS

2007/0297386 A1* 12/2007 Zhang .................. H04L 5/06
370/344
2009/0097444 A1*  4/2009 Lohr .................... H04W 72/14
370/329
(Continued)

FOREIGN PATENT DOCUMENTS

CN        101064865 A     10/2007
CN        101742656 A      6/2010
(Continued)

*Primary Examiner* — Robert J Lopata
(74) *Attorney, Agent, or Firm* — Slater Matsil, LLP

(57) ABSTRACT

Embodiments disclose an uplink data transmission method and apparatus. The method includes: determining M transmission areas allocated to a terminal device, and generating first information used to indicate the M transmission areas, where M is a positive integer, and the transmission area represents an air interface time-frequency resource that includes a time range and a frequency range that are specified by a communications system. The method also includes determining, for each transmission area of the M transmission areas, second information used to indicate a transport block size. The method also includes sending an indication message to the terminal device, so that the terminal device transmits uplink data according to the indication message, where the indication message includes the first information and the second information.

26 Claims, 7 Drawing Sheets

(51) Int. Cl.
*H04W 72/04* (2009.01)
*H04L 5/00* (2006.01)
(52) U.S. Cl.
CPC ......... *H04W 72/04* (2013.01); *H04W 72/048* (2013.01); *H04L 5/0016* (2013.01); *H04L 5/0051* (2013.01)
(58) Field of Classification Search
CPC ............. H04L 12/185; H04L 29/06455; H04L 29/08693; H04L 29/12292; H04L 47/15; H04W 72/005; H04W 72/04; H04W 72/048; H04W 72/1268; H04J 2203/0019
USPC ......................................................... 370/312
See application file for complete search history.

(56) References Cited

U.S. PATENT DOCUMENTS

| | | |
|---|---|---|
| 2009/0225721 A1 | 9/2009 | Cudak et al. |
| 2010/0238823 A1* | 9/2010 | Chen ............... H04L 1/1822 370/252 |
| 2011/0176500 A1* | 7/2011 | Wager ............. H04W 74/006 370/329 |
| 2012/0057547 A1 | 3/2012 | Löhr et al. |
| 2012/0263095 A1* | 10/2012 | Quan ............... H04W 52/0216 370/312 |
| 2013/0308504 A1* | 11/2013 | Nimbalker ........... H04L 5/001 370/281 |
| 2014/0050090 A1* | 2/2014 | Nordstrom ........ H04W 72/1247 370/232 |
| 2014/0192767 A1 | 7/2014 | Au et al. |
| 2014/0321410 A1* | 10/2014 | Frederiksen ........ H04W 72/082 370/329 |
| 2014/0341162 A1* | 11/2014 | Yang .................... H04L 1/0007 370/329 |
| 2015/0005028 A1* | 1/2015 | Yang .................... H04W 72/02 455/522 |
| 2015/0043526 A1 | 2/2015 | Wang et al. |
| 2015/0117396 A1* | 4/2015 | Wang .................. H04W 72/042 370/330 |
| 2015/0257150 A1* | 9/2015 | Yi ............................ H04B 7/26 370/329 |
| 2015/0319776 A1* | 11/2015 | Seo ...................... H04W 74/002 370/329 |
| 2015/0334653 A1* | 11/2015 | Ang .................. H04W 28/0221 370/311 |
| 2016/0057636 A1* | 2/2016 | Ibrahim ............ H04W 52/0209 370/328 |
| 2016/0081081 A1 | 3/2016 | Xu et al. |
| 2016/0302116 A1* | 10/2016 | Chamarti ............. H04B 17/318 |
| 2017/0223686 A1* | 8/2017 | You ....................... H04L 5/0048 |
| 2018/0199363 A1* | 7/2018 | Lee ....................... H04L 5/0044 |
| 2018/0249499 A1* | 8/2018 | Kim ....................... H04W 72/04 |

FOREIGN PATENT DOCUMENTS

| | | |
|---|---|---|
| CN | 101925077 A | 12/2010 |
| CN | 102064929 B | 9/2013 |
| CN | 103534969 A | 1/2014 |
| CN | 103547340 A | 1/2014 |
| CN | 104244426 A | 12/2014 |
| EP | 2106057 A1 | 9/2009 |
| EP | 2244514 A1 | 10/2010 |
| EP | 2536242 A1 | 12/2012 |
| JP | 2011515047 A | 5/2011 |
| JP | 2012525030 A | 10/2012 |
| WO | 2014135126 A1 | 9/2014 |
| WO | 2014146280 A1 | 9/2014 |
| WO | 2014198133 A1 | 12/2014 |
| WO | 2014205736 A1 | 12/2014 |

\* cited by examiner

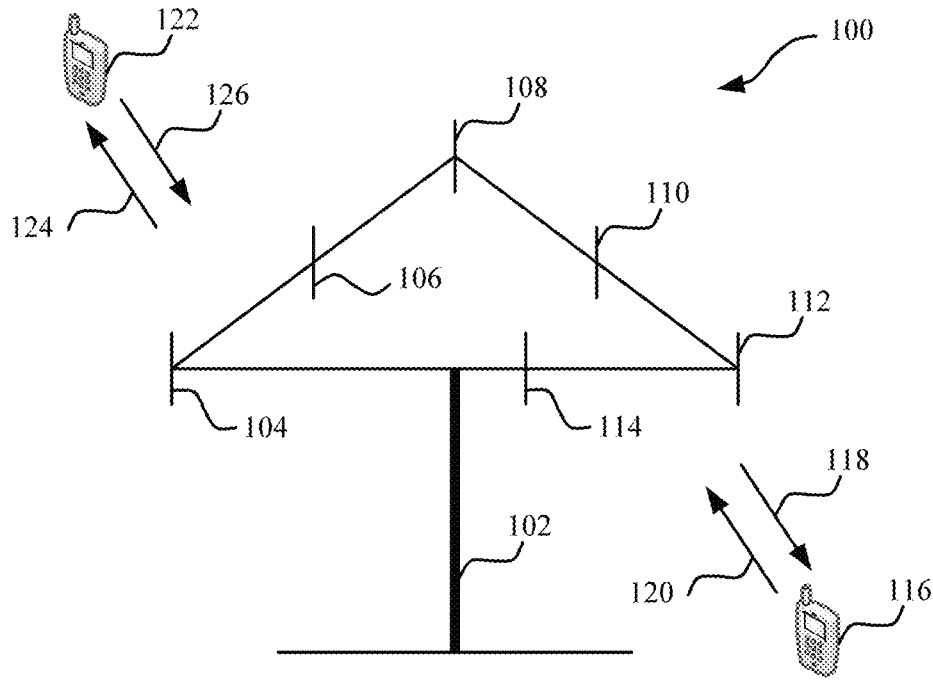

Determine M transmission areas allocated to a terminal device, and generate first information used to indicate the M transmission areas, where M is a positive integer, and the transmission area represents an air interface time-frequency resource that includes a time range and a frequency range that are specified by a communications system — S201

Determine, for each transmission area of the M transmission areas, second information used to indicate a transport block size — S202

Send an indication message to the terminal device, so that the terminal device transmits uplink data according to the indication message, where the indication message includes the first information and the second information — S203

FIG. 2

UPLINK DATA TRANSMISSION METHOD AND APPARATUS

CROSS-REFERENCE TO RELATED APPLICATIONS

This application is a continuation of International Patent Application No. PCT/CN2015/073567, filed on Mar. 3, 2015, the disclosure of which is hereby incorporated by reference in its entirety.

TECHNICAL FIELD

The present invention relates to the communications field, and in particular, to an uplink data transmission method and apparatus in the communications field.

BACKGROUND

As wireless cellular networks continuously evolve, orthogonal multiple access technologies such as a Code Division Multiple Access (CDMA) technology and an Orthogonal Frequency Division Multiple Access (OFDMA) technology that are widely applied to third-generation (3G) and fourth-generation (4G) mobile communications systems already gradually become inadequate to meet increasing capacity requirements of people on cellular networks, for example, are already inadequate to meet massive access and continuous increase of spectral efficiency, and the like. With ongoing development of research and application of non-orthogonal multiple access technologies, people hope that a future wireless cellular network such as a fifth-generation (5G) mobile communications system can effectively address a problem of increasing capacity requirements by means of non-orthogonal multiple access technologies.

In another aspect, conventional request-grant-based uplink data transmission in a cellular network is usually performed according to the following steps: First, a user sends a service request to a base station by using a specific resource (for example, a time-frequency resource). After receiving the service request, the base station grants uplink data transmission for the user according to a data buffer status reported by the user periodically or non-periodically, and delivers, to the user, an allocated resource for use in uplink transmission. Finally, the user transmits uplink data according to grant information by using the allocated uplink resource.

At an initial stage of an evolution process of a cellular network, a quantity of terminals increases relatively slowly, and users have relatively low requirements on delays. A conventional request-grant-based uplink data transmission method can be widely applied to 3G and 4G systems. However, as application scenarios, terminal types, and application types become increasingly varied, in a future evolution process of the cellular network, the quantity of terminals increases in an explosive manner. In specific application scenarios, users also impose higher requirements on network delays. In such a case, the conventional request-grant-based uplink data transmission method becomes no longer applicable because of relatively long delays and relatively high signaling overheads.

Compared with a conventional request-grant-based transmission method, in a non-grant-mode transmission method, a user directly sends uplink data by using a specific resource without needing to undergo a process from service requesting to uplink granting by a base station. Therefore, the non-grant-mode transmission method has significant advantages in terms of network delays and signaling overheads. In a non-orthogonal multiple access technology, it is allowed to use different codebooks to send different data streams on a same time-frequency resource, and a receive end can implement error-free decoding of multiple data streams. Therefore, a non-grant-mode uplink transmission method in which a non-orthogonal multiple access technology is combined has the potential to be extremely widely applied in future cellular communications systems (for example, 5G).

Currently, a non-grant-mode uplink transmission method in an SCMA system is: A base station assigns one contention transmission unit (CTU) to each user. The CTU is defined as a combination of a time-frequency resource and an SCMA codebook or a pilot sequence. After a user has reached uplink synchronization with the base station, if uplink data needs to be sent, the user directly generates the uplink data by using an SCMA codebook in a corresponding CTU and directly generates a pilot by using a pilot sequence in the corresponding CTU, and sends the uplink data and the pilot on a time-frequency resource specified by the CTU. The base station decodes user data on a possible time-frequency resource by using a blind detection method and by using a possible SCMA codebook and pilot sequence.

However, because the base station needs to try sizes of all possible transport blocks during decoding, so as to perform blind detection on user data. The blind detection has huge costs. For example, a processing delay is extremely long, and even exceeds a transmission delay that can be saved in a non-grant-mode transmission method, thereby causing the non-grant-mode transmission method to lose an advantage of a short delay over the conventional request-grant-based transmission method.

SUMMARY

Embodiments of the present invention provide an uplink data transmission method and apparatus, which can reduce a delay in decoding processing of uplink data.

According to a first aspect, an uplink data transmission method is provided. The method includes determining M transmission areas allocated to a terminal device, and generating first information used to indicate the M transmission areas, where M is a positive integer, and the transmission area represents an air interface time-frequency resource that includes a time range and a frequency range that are specified by a communications system. The method also includes determining, for each transmission area of the M transmission areas, second information used to indicate a transport block size. The method also includes sending an indication message to the terminal device, so that the terminal device transmits uplink data according to the indication message, where the indication message includes the first information and the second information.

With reference to the first aspect, in a first possible implementation manner of the first aspect, the method further includes: determining at least one codebook-pilot set for each transmission area of the M transmission areas, and generating third information used to indicate the at least one codebook-pilot set, where the indication message further includes the third information, and the codebook-pilot set includes multiple codebooks, multiple pilot sequences, and a combination relationship between a codebook and a pilot sequence.

With reference to the first possible implementation manner of the first aspect, in a second possible implementation manner of the first aspect, the codebook includes two or more codewords, the codeword is a multidimensional complex vector and is used to represent a mapping relationship between data and at least two modulation symbols, and the at least two modulation symbols include at least one zero modulation symbol and at least one non-zero modulation symbol.

With reference to the first aspect or the first or the second possible implementation manner of the first aspect, in a third possible implementation manner of the first aspect, the third information includes an index of the at least one codebook-pilot set.

With reference to any one of the first aspect or the first to the third possible implementation manners of the first aspect, in a fourth possible implementation manner of the first aspect, the second information includes information about a transport block size determined for each transmission area of the M transmission areas; or the second information includes information about a coding rate determined for each transmission area of the M transmission areas, so that the terminal device determines a transport block size according to a quantity of unit time-frequency resources that are in a transmission area and that can be used to transmit data, a modulation order, and the coding rate.

With reference to any one of the first aspect or the first to the fourth possible implementation manners of the first aspect, in a fifth possible implementation manner of the first aspect, the second information includes an index of the transport block size determined for each transmission area of the M transmission areas; or the second information includes an index of the coding rate determined for each transmission area of the M transmission areas.

With reference to any one of the first aspect or the first to the fifth possible implementation manners of the first aspect, in a sixth possible implementation manner of the first aspect, the method further includes: receiving uplink data that is sent by the terminal device on N transmission areas according to transport block sizes of the N transmission areas, where N is a positive integer less than or equal to M; and decoding the uplink data on the N transmission areas according to the transport block sizes of the N transmission areas.

With reference to any one of the first aspect or the first to the sixth possible implementation manners of the first aspect, in a seventh possible implementation manner of the first aspect, the first information includes time domain information and frequency domain information of each transmission area of the M transmission areas.

With reference to any one of the first aspect or the first to the seventh possible implementation manners of the first aspect, in an eighth possible implementation manner of the first aspect, the first information includes a first bit string used to indicate a subframe of a time domain of each transmission area of the M transmission areas and a second bit string used to indicate a resource block of a frequency domain of each transmission area of the M transmission areas.

With reference to any one of the first aspect or the first to the eighth possible implementation manners of the first aspect, in a ninth possible implementation manner of the first aspect, the sending an indication message to the terminal device includes: carrying the indication message on a broadcast channel, and sending, in a broadcast manner, the indication message to all or some of terminal devices served by a network device; or carrying the indication message on a dedicated control channel, and sending, in a unicast manner, the indication message to one specific terminal device or one specific group of terminal devices served by the network device.

According to a second aspect, an uplink data transmission method is provided. The method includes receiving an indication message sent by a network device, where the indication message includes first information and second information, the first information is used to indicate M transmission areas allocated by the network device, the second information is used to indicate a transport block size of each transmission area of the M transmission areas, M is a positive integer, and the transmission area represents an air interface time-frequency resource that includes a time range and a frequency range that are specified by a communications system. The method also includes selecting N transmission areas from the M transmission areas according to the first information, where N is a positive integer less than or equal to M. The method also includes determining a transport block size of each transmission area of the N transmission areas according to the second information. The method also includes sending, on each transmission area of the N transmission areas, uplink data to the network device according to the transport block size of each transmission area of the N transmission areas.

With reference to the second aspect, in a first possible implementation manner of the second aspect, the method further includes: selecting one constellation-pilot combination from a preset constellation-pilot set for each transmission area of the N transmission areas, where the constellation-pilot set includes multiple constellation-pilot combinations; and generating an uplink pilot signal according to a pilot sequence in the constellation-pilot combination; and the sending, on each transmission area of the N transmission areas, uplink data to the network device according to the transport block size of each transmission area of the N transmission areas includes: generating the uplink data on each transmission area of the N transmission areas according to a modulation constellation in the constellation-pilot combination and according to the transport block size of each transmission area of the N transmission areas; and sending the uplink pilot and the uplink data to the network device on each transmission area of the N transmission areas.

With reference to the second aspect, in a second possible implementation manner of the second aspect, the indication message further includes third information, the third information is used to indicate at least one codebook-pilot set that is determined by the network device for each transmission area of the M transmission areas, and the codebook-pilot set includes multiple codebooks, pilot sequences, and a combination relationship between a codebook and a pilot sequence; the method further includes: determining at least one codebook-pilot set of each transmission area of the N transmission areas according to the third information; selecting one codebook-pilot combination from the at least one codebook-pilot set for each transmission area of the N transmission areas; and generating an uplink pilot signal according to a pilot sequence in the codebook-pilot combination; and the sending, on each transmission area of the N transmission areas, uplink data to the network device according to the transport block size of each transmission area of the N transmission areas includes: generating the uplink data on each transmission area of the N transmission areas according to a codebook in the codebook-pilot combination and according to the transport block size of each transmission area of the N transmission areas; and sending the uplink pilot and the uplink data to the network device on each transmission area of the N transmission areas.

With reference to the second possible implementation manner of the second aspect, in a third possible implementation manner of the second aspect, the codebook includes two or more codewords, the codeword is a multidimensional complex vector and is used to represent a mapping relationship between data and at least two modulation symbols, and the at least two modulation symbols include at least one zero modulation symbol and at least one non-zero modulation symbol.

With reference to the second or the third possible implementation manner of the second aspect, in a fourth possible implementation manner of the second aspect, the third information includes an index of the at least one codebook-pilot set.

With reference to the first possible implementation manner of the second aspect, in a fifth possible implementation manner of the second aspect, the constellation-pilot combination meets the following condition: a quantity of unit time-frequency resources that are in a transmission area and that can be used to transmit data*a modulation order of a modulation constellation in a constellation-pilot combination>a transport block size determined for the transmission area.

With reference to any one of the second to the fourth possible implementation manners of the second aspect, in a sixth possible implementation manner of the second aspect, the codebook-pilot combination meets the following condition: a quantity of unit time-frequency resources that are in a transmission area and that can be used to transmit data*a modulation order of a codebook in a codebook-pilot combination>a transport block size determined for the transmission area.

With reference to any one of the second aspect or the first to the sixth possible implementation manners of the second aspect, in a seventh possible implementation manner of the second aspect, the second information includes information about a coding rate that is determined by the network device for each transmission area of the M transmission areas, and the determining a transport block size of each transmission area of the N transmission areas according to the second information includes: determining the transport block size of each transmission area of the N transmission areas according to a quantity of unit time-frequency resources that are in each transmission area of the N transmission areas and that can be used to transmit data, a modulation order, and the coding rate.

With reference to any one of the second aspect or the first to the sixth possible implementation manners of the second aspect, in an eighth possible implementation manner of the second aspect, the second information includes an index of the transport block size determined for each transmission area of the M transmission areas; or the second information includes an index of a coding rate determined for each transmission area of the M transmission areas.

With reference to any one of the second aspect or the first to the eighth possible implementation manners of the second aspect, in a ninth possible implementation manner of the second aspect, the first information includes time domain information and frequency domain information of each transmission area of the M transmission areas.

With reference to any one of the second aspect or the first to the ninth possible implementation manners of the second aspect, in a tenth possible implementation manner of the second aspect, the first information includes a first bit string used to indicate a subframe of a time domain of each transmission area of the M transmission areas and a second bit string used to indicate a resource block of a frequency domain of each transmission area of the M transmission areas.

According to a third aspect, an uplink data transmission apparatus is provided. The apparatus includes a first determining module, configured to: determine M transmission areas allocated to a terminal device, and generate first information used to indicate the M transmission areas, where M is a positive integer, and the transmission area represents an air interface time-frequency resource that includes a time range and a frequency range that are specified by a communications system. The apparatus also includes a second determining module, configured to determine, for each transmission area of the M transmission areas that are determined by the first determining module, second information used to indicate a transport block size. The apparatus also includes a sending module, configured to send an indication message to the terminal device, so that the terminal device transmits uplink data according to the indication message, where the indication message includes the first information determined by the first determining module and the second information determined by the second determining module.

With reference to the third aspect, in a first possible implementation manner of the third aspect, the apparatus further includes: a second determining module, configured to: determine at least one codebook-pilot set for each transmission area of the M transmission areas that are determined by the first determining module, and generate third information used to indicate the at least one codebook-pilot set, where the indication message sent by the sending module further includes the third information, and the codebook-pilot set includes multiple codebooks, multiple pilot sequences, and a combination relationship between a codebook and a pilot sequence.

With reference to the first possible implementation manner of the third aspect, in a second possible implementation manner of the third aspect, the codebook includes two or more codewords, the codeword is a multidimensional complex vector and is used to represent a mapping relationship between data and at least two modulation symbols, and the at least two modulation symbols include at least one zero modulation symbol and at least one non-zero modulation symbol.

With reference to the third aspect or the first or the second possible implementation manner of the third aspect, in a third possible implementation manner of the third aspect, the third information includes an index of the at least one codebook-pilot set.

With reference to any one of the third aspect or the first to the third possible implementation manners of the third aspect, in a fourth possible implementation manner of the third aspect, the second information includes information about a transport block size determined for each transmission area of the M transmission areas; or the second information includes information about a coding rate determined for each transmission area of the M transmission areas, so that the terminal device determines a transport block size according to a quantity of unit time-frequency resources that are in a transmission area and that can be used to transmit data, a modulation order, and the coding rate.

With reference to any one of the third aspect or the first to the fourth possible implementation manners of the third aspect, in a fifth possible implementation manner of the third aspect, the second information includes an index of the transport block size determined for each transmission area of the M transmission areas; or the second information includes an index of the coding rate determined for each transmission area of the M transmission areas.

With reference to any one of the third aspect or the first to the fifth possible implementation manners of the third aspect, in a sixth possible implementation manner of the third aspect, the apparatus further includes: a receiving module, configured to receive uplink data that is sent by the terminal device on N transmission areas according to transport block sizes of the N transmission areas, where N is a positive integer less than or equal to M; and a decoding module, configured to decode the uplink data on the N transmission areas according to the transport block sizes of the N transmission areas.

With reference to any one of the third aspect or the first to the sixth possible implementation manners of the third aspect, in a seventh possible implementation manner of the third aspect, the first information includes time domain information and frequency domain information of each transmission area of the M transmission areas.

With reference to any one of the third aspect or the first to the seventh possible implementation manners of the third aspect, in an eighth possible implementation manner of the third aspect, the first information includes a first bit string used to indicate a subframe of a time domain of each transmission area of the M transmission areas and a second bit string used to indicate a resource block of a frequency domain of each transmission area of the M transmission areas.

With reference to any one of the third aspect or the first to the eighth possible implementation manners of the third aspect, in a ninth possible implementation manner of the third aspect, the sending module is specifically configured to: carry the indication message on a broadcast channel, and send, in a broadcast manner, the indication message to all or some of terminal devices served by a network device; or carry the indication message on a dedicated control channel, and send, in a unicast manner, the indication message to one specific terminal device or one specific group of terminal devices served by the network device.

With reference to any one of the third aspect or the first to the ninth possible implementation manners of the third aspect, in a tenth possible implementation manner of the third aspect, the apparatus is a network device.

According to a fourth aspect, an uplink data transmission apparatus is provided. The apparatus includes a receiving module, configured to receive an indication message sent by a network device, where the indication message includes first information and second information, the first information is used to indicate M transmission areas allocated by the network device, the second information is used to indicate a transport block size of each transmission area of the M transmission areas, M is a positive integer, and the transmission area represents an air interface time-frequency resource that includes a time range and a frequency range that are specified by a communications system. The apparatus also includes a first determining module, configured to select N transmission areas from the M transmission areas according to the first information, where N is a positive integer less than or equal to M. The apparatus also includes a second determining module, configured to determine, according to the second information, transport block sizes of the N transmission areas determined by the first determining module. The apparatus also includes a sending module, configured to send, on each transmission area of the N transmission areas determined by the first determining module, uplink data to the network device according to the transport block size, which is determined by the second determining module, of each transmission area of the N transmission areas.

With reference to the fourth aspect, in a first possible implementation manner of the fourth aspect, the apparatus further includes: a third determining module, configured to select one constellation-pilot combination from a preset constellation-pilot set for each transmission area of the N transmission areas, where the constellation-pilot set includes multiple constellation-pilot combinations; and a first generation module, configured to generate an uplink pilot signal according to a pilot sequence in the constellation-pilot combination determined by the third determining module. The sending module is specifically configured to: generate uplink data on each transmission area of the N transmission areas according to a modulation constellation in the constellation-pilot combination and according to the transport block size of each transmission area of the N transmission areas; and send the uplink pilot and the uplink data to the network device on each transmission area of the N transmission areas.

With reference to the fourth aspect, in a second possible implementation manner of the fourth aspect, the indication message further includes third information, the third information is used to indicate at least one codebook-pilot set that is determined by the network device for each transmission area of the M transmission areas, and the codebook-pilot set includes multiple codebooks, pilot sequences, and a combination relationship between a codebook and a pilot sequence. The apparatus further includes: a fourth determining module, configured to determine at least one codebook-pilot set of each transmission area of the N transmission areas according to the third information; a fifth determining module, configured to select one codebook-pilot combination from the at least one codebook-pilot set for each transmission area of the N transmission areas; and a second generation module, configured to generate an uplink pilot signal according to a pilot sequence in the codebook-pilot combination. The sending module is specifically configured to: generate uplink data on each transmission area of the N transmission areas according to a codebook in the codebook-pilot combination and according to the transport block size of each transmission area of the N transmission areas; and send the uplink pilot and the uplink data to the network device on each transmission area of the N transmission areas.

With reference to the second possible implementation manner of the fourth aspect, in a third possible implementation manner of the fourth aspect, the codebook includes two or more codewords, the codeword is a multidimensional complex vector and is used to represent a mapping relationship between data and at least two modulation symbols, and the at least two modulation symbols include at least one zero modulation symbol and at least one non-zero modulation symbol.

With reference to the second or the third possible implementation manner of the fourth aspect, in a fourth possible implementation manner of the fourth aspect, the third information includes an index of the at least one codebook-pilot set.

With reference to the first possible implementation manner of the fourth aspect, in a fifth possible implementation manner of the fourth aspect, the constellation-pilot combination meets the following condition: a quantity of unit time-frequency resources that are in a transmission area and that can be used to transmit data*a modulation order of a modulation constellation in a constellation-pilot combination>a transport block size determined for the transmission area.

With reference to any one of the second to the fourth possible implementation manners of the fourth aspect, in a sixth possible implementation manner of the fourth aspect, the codebook-pilot combination meets the following condition: a quantity of unit time-frequency resources that are in a transmission area and that can be used to transmit data*a modulation order of a codebook in a codebook-pilot combination>a transport block size determined for the transmission area.

With reference to any one of the fourth aspect or the first to the sixth possible implementation manners of the fourth aspect, in a seventh possible implementation manner of the fourth aspect, the second information includes information about a transport block size that is determined by the network device for each transmission area of the M transmission areas; or the second information includes information about a coding rate that is determined by the network device for each transmission area of the M transmission areas, and the determining a transport block size of each transmission area of the N transmission areas according to the second information includes: determining the transport block size of each transmission area of the N transmission areas according to a quantity of unit time-frequency resources that are in each transmission area of the N transmission areas and that can be used to transmit data, a modulation order, and the coding rate.

With reference to any one of the fourth aspect or the first to the sixth possible implementation manners of the fourth aspect, in an eighth possible implementation manner of the fourth aspect, the second information includes an index of the transport block size determined for each transmission area of the M transmission areas; or the second information includes an index of a coding rate determined for each transmission area of the M transmission areas.

With reference to any one of the fourth aspect or the first to the eighth possible implementation manners of the fourth aspect, in a ninth possible implementation manner of the fourth aspect, the first information includes time domain information and frequency domain information of each transmission area of the M transmission areas.

With reference to any one of the fourth aspect or the first to the ninth possible implementation manners of the fourth aspect, in a tenth possible implementation manner of the fourth aspect, the first information includes a first bit string used to indicate a subframe of a time domain of each transmission area of the M transmission areas and a second bit string used to indicate a resource block of a frequency domain of each transmission area of the M transmission areas.

With reference to any one of the fourth aspect or the first to the tenth possible implementation manners of the fourth aspect, in an eleventh possible implementation manner of the fourth aspect, the apparatus is a terminal device.

According to a fifth aspect, an uplink data transmission apparatus is provided, including a processor, a memory, a bus system, and a transceiver, where the processor, the memory, and the transceiver are connected by using the bus system, the memory is configured to store an instruction, and the processor is configured to execute the instruction stored in the memory, so as to control the transceiver to send a signal. The processor is configured to: determine M transmission areas allocated to a terminal device, and generate first information used to indicate the M transmission areas, where M is a positive integer, and the transmission area represents an air interface time-frequency resource that includes a time range and a frequency range that are specified by a communications system; and determine, for each transmission area of the M transmission areas, second information used to indicate a transport block size. The transceiver is configured to send an indication message to the terminal device, so that the terminal device transmits uplink data according to the indication message, where the indication message includes the first information and the second information.

With reference to the fifth aspect, in a first possible implementation manner of the fifth aspect, the processor is further configured to: determine at least one codebook-pilot set for each transmission area of the M transmission areas, and generate third information used to indicate the at least one codebook-pilot set, where the codebook-pilot set includes multiple codebooks, multiple pilot sequences, and a combination relationship between a codebook and a pilot sequence, and the indication message sent by the transceiver further includes the third information.

With reference to the first possible implementation manner of the fifth aspect, in a second possible implementation manner of the fifth aspect, the codebook includes two or more codewords, the codeword is a multidimensional complex vector and is used to represent a mapping relationship between data and at least two modulation symbols, and the at least two modulation symbols include at least one zero modulation symbol and at least one non-zero modulation symbol.

With reference to the fifth aspect or the first or the second possible implementation manner of the fifth aspect, in a third possible implementation manner of the fifth aspect, the third information includes an index of the at least one codebook-pilot set.

With reference to any one of the fifth aspect or the first to the third possible implementation manners of the fifth aspect, in a fourth possible implementation manner of the fifth aspect, the second information includes information about a transport block size determined for each transmission area of the M transmission areas; or the second information includes information about a coding rate determined for each transmission area of the M transmission areas, so that the terminal device determines a transport block size according to a quantity of unit time-frequency resources that are in a transmission area and that can be used to transmit data, a modulation order, and the coding rate.

With reference to any one of the fifth aspect or the first to the fourth possible implementation manners of the fifth aspect, in a fifth possible implementation manner of the fifth aspect, the second information includes an index of the transport block size determined for each transmission area of the M transmission areas; or the second information includes an index of the coding rate determined for each transmission area of the M transmission areas.

With reference to any one of the fifth aspect or the first to the fifth possible implementation manners of the fifth aspect, in a sixth possible implementation manner of the fifth aspect, the transceiver is further configured to: receive uplink data that is sent by the terminal device on N transmission areas according to transport block sizes of the N transmission areas, where N is a positive integer less than or equal to M. The processor is further configured to: decode the uplink data on the N transmission areas according to the transport block sizes of the N transmission areas.

With reference to any one of the fifth aspect or the first to the sixth possible implementation manners of the fifth aspect, in a seventh possible implementation manner of the fifth aspect, the first information includes time domain information and frequency domain information of each transmission area of the M transmission areas.

With reference to any one of the fifth aspect or the first to the seventh possible implementation manners of the fifth aspect, in an eighth possible implementation manner of the fifth aspect, the first information includes a first bit string used to indicate a subframe of a time domain of each transmission area of the M transmission areas and a second bit string used to indicate a resource block of a frequency domain of each transmission area of the M transmission areas.

With reference to any one of the fifth aspect or the first to the eighth possible implementation manners of the fifth aspect, in a ninth possible implementation manner of the fifth aspect, the sending, by the transceiver, an indication message to the terminal device includes: carrying the indication message on a broadcast channel, and sending, in a broadcast manner, the indication message to all or some of terminal devices served by a network device; or carrying the indication message on a dedicated control channel, and sending, in a unicast manner, the indication message to one specific terminal device or one specific group of terminal devices served by the network device.

With reference to any one of the fifth aspect or the first to the ninth possible implementation manners of the fifth aspect, in a tenth possible implementation manner of the fifth aspect, the apparatus is a network device.

According to a sixth aspect, an uplink data transmission apparatus is provided, including a processor, a memory, a bus system, and a transceiver, where the processor, the memory, and the transceiver are connected by using the bus system, the memory is configured to store an instruction, and the processor is configured to execute the instruction stored in the memory, so as to control the transceiver to send a signal. The transceiver is configured to: receive an indication message sent by a network device, where the indication message includes first information and second information, the first information is used to indicate M transmission areas allocated by the network device, the second information is used to indicate a transport block size of each transmission area of the M transmission areas, M is a positive integer, and the transmission area represents an air interface time-frequency resource that includes a time range and a frequency range that are specified by a communications system. The processor is configured to: select N transmission areas from the M transmission areas according to the first information, where N is a positive integer less than or equal to M; and determine a transport block size of each transmission area of the N transmission areas according to the second information. The transceiver is further configured to: send, on each transmission area of the N transmission areas, uplink data to the network device according to the transport block size of each transmission area of the N transmission areas.

With reference to the sixth aspect, in a first possible implementation manner of the sixth aspect, the processor is further configured to: select one constellation-pilot combination from a preset constellation-pilot set for each transmission area of the N transmission areas, where the constellation-pilot set includes multiple constellation-pilot combinations; and generate an uplink pilot signal according to a pilot sequence in the constellation-pilot combination; and the sending, by the transceiver on each transmission area of the N transmission areas, uplink data to the network device according to the transport block size of each transmission area of the N transmission areas includes: generating the uplink data on each transmission area of the N transmission areas according to a modulation constellation in the constellation-pilot combination and according to the transport block size of each transmission area of the N transmission areas; and sending the uplink pilot and the uplink data to the network device on each transmission area of the N transmission areas.

With reference to the sixth aspect, in a second possible implementation manner of the sixth aspect, the indication message further includes third information, the third information is used to indicate at least one codebook-pilot set that is determined by the network device for each transmission area of the M transmission areas, and the codebook-pilot set includes multiple codebooks, pilot sequences, and a combination relationship between a codebook and a pilot sequence; the processor is further configured to: determine at least one codebook-pilot set of each transmission area of the N transmission areas according to the third information; select one codebook-pilot combination from the at least one codebook-pilot set for each transmission area of the N transmission areas; and generate an uplink pilot signal according to a pilot sequence in the codebook-pilot combination. The sending, by the transceiver on each transmission area of the N transmission areas, uplink data to the network device according to the transport block size of each transmission area of the N transmission areas includes: generating the uplink data on each transmission area of the N transmission areas according to a codebook in the codebook-pilot combination and according to the transport block size of each transmission area of the N transmission areas; and sending the uplink pilot and the uplink data to the network device on each transmission area of the N transmission areas.

With reference to the second possible implementation manner of the sixth aspect, in a third possible implementation manner of the sixth aspect, the codebook includes two or more codewords, the codeword is a multidimensional complex vector and is used to represent a mapping relationship between data and at least two modulation symbols, and the at least two modulation symbols include at least one zero modulation symbol and at least one non-zero modulation symbol.

With reference to the second or the third possible implementation manner of the sixth aspect, in a fourth possible implementation manner of the sixth aspect, the third information includes an index of the at least one codebook-pilot set.

With reference to the first possible implementation manner of the sixth aspect, in a fifth possible implementation manner of the sixth aspect, the constellation-pilot combination meets the following condition: a quantity of unit time-frequency resources that are in a transmission area and that can be used to transmit data*a modulation order of a modulation constellation in a constellation-pilot combination>a transport block size determined for the transmission area.

With reference to any one of the second to the fourth possible implementation manners of the sixth aspect, in a sixth possible implementation manner of the sixth aspect, the codebook-pilot combination meets the following condition: a quantity of unit time-frequency resources that are in a transmission area and that can be used to transmit data*a modulation order of a codebook in a codebook-pilot combination>a transport block size determined for the transmission area.

With reference to any one of the sixth aspect or the first to the sixth possible implementation manners of the sixth aspect, in a sixth possible implementation manner of the sixth aspect, the second information includes information about a transport block size that is determined by the network device for each transmission area of the M transmission areas; or the second information includes information about a coding rate that is determined by the network device for each transmission area of the M transmission areas, and the determining, by the processor, a transport block size of each transmission area of the N transmission areas according to the second information includes: determining the transport block size of each transmission area of the N transmission areas according to a quantity of unit time-frequency resources that are in each transmission area of the N transmission areas and that can be used to transmit data, a modulation order, and the coding rate.

With reference to any one of the sixth aspect or the first to the sixth possible implementation manners of the sixth aspect, in an eighth possible implementation manner of the sixth aspect, the second information includes an index of the transport block size determined for each transmission area of the M transmission areas; or the second information includes an index of a coding rate determined for each transmission area of the M transmission areas.

With reference to any one of the sixth aspect or the first to the eighth possible implementation manners of the sixth aspect, in a ninth possible implementation manner of the sixth aspect, the first information includes time domain information and frequency domain information of each transmission area of the M transmission areas.

With reference to any one of the sixth aspect or the first to the ninth possible implementation manners of the sixth aspect, in a tenth possible implementation manner of the sixth aspect, the first information includes a first bit string used to indicate a subframe of a time domain of each transmission area of the M transmission areas and a second bit string used to indicate a resource block of a frequency domain of each transmission area of the M transmission areas.

With reference to any one of the sixth aspect or the first to the tenth possible implementation manners of the sixth aspect, in an eleventh possible implementation manner of the sixth aspect, the apparatus is a terminal device.

Based on the foregoing technical solutions, for the uplink data transmission method and apparatus provided in the embodiments of the present invention, a network device determines at least one transmission area, and related information about a transport block size is assigned to the transmission area, so that a terminal device transmits uplink data on the transmission area by using the corresponding transport block size. Therefore, a network device can decode uplink data on a transmission area according to a transport block size. In this way, a processing delay can be reduced.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 1 is a schematic diagram of a communications system applicable to an uplink data transmission method according to an embodiment of the present invention;

FIG. 2 is a schematic flowchart of an uplink data transmission method according to an embodiment of the present invention;

DETAILED DESCRIPTION OF ILLUSTRATIVE EMBODIMENTS

Figure 3:
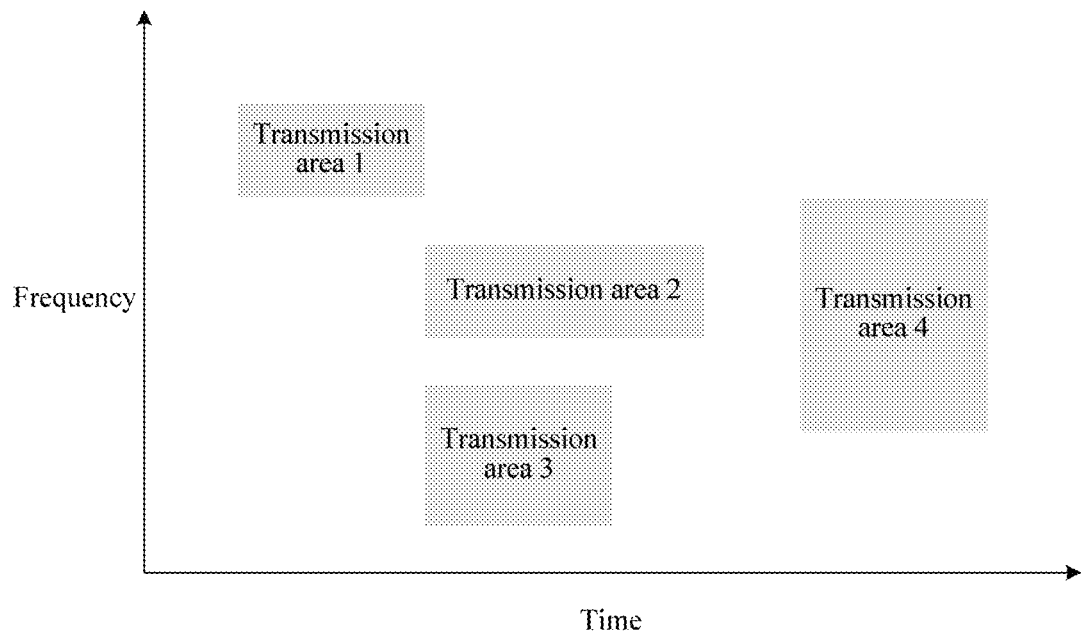
FIG. 3 is a schematic diagram of a transmission area according to an embodiment of the present invention.

The following describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Terminologies such as "component", "module", and "system" used in this specification are used to represent computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from one component interacting with another component in a local system, a distributed system, and/or across a network such as the Internet interacting with other systems by using the signal).

The embodiments of the present invention are described by using a terminal device. The terminal device may also be referred to as user equipment (UE), an access terminal, a user unit, a user station, a mobile site, a mobile station, a remote station, a remote terminal, a mobile device, a user terminal, a terminal, a wireless communications device, a user agent, or a user apparatus. The access terminal may be a cellular phone, a cordless phone, a SIP (Session Initiation Protocol) phone, a WLL (Wireless Local Loop) station, a PDA (Personal Digital Assistant), a handheld device having a wireless communications function, a computing device, another processing device connected to a wireless modem, an in-vehicle device, a wearable device, or a terminal device in a future 5G network.

In addition, the embodiments of the present invention are described by using a network device. The network device may be a base station or another device that is configured to communicate with a mobile device. The base station may be a BTS (Base Transceiver Station) in GSM (Global System for Mobile Communications) or CDMA (Code Division Multiple Access), or may be an NB (NodeB) in WCDMA (Wideband Code Division Multiple Access), or may be an eNB or eNodeB (Evolved Node B) in LTE (Long Term Evolution), or a relay station or an access point, or an in-vehicle device, a wearable device, or a network device in a future 5G network.

In addition, aspects or features of the present invention may be implemented as a method, an apparatus or a product that uses standard programming and/or engineering technologies. The term "product" used in this application covers a computer program that can be accessed from any computer readable component, carrier or medium. For example, the computer-readable medium may include but is not limited to: a magnetic storage component (for example, a hard disk, a floppy disk or a magnetic tape), an optical disc (for example, a CD (Compact Disk, compact disk), a DVD (Digital Versatile Disk), a smart card and a flash memory component (for example, EPROM (Erasable Programmable Read-Only Memory), a card, a stick, or a key drive). In addition, various storage media described in this specification may represent one or more devices and/or other machine-readable media that is used to store information. The term "machine readable media" may include but is not limited to a radio channel, and various other media that can store, contain and/or carry an instruction and/or data.

FIG. 1 is a schematic diagram of a communications system 100 applicable to an uplink data transmission method according to an embodiment of the present invention. As shown in FIG. 1, the communications system 100 includes a network device 102. The network device 102 may include multiple antenna groups. Each antenna group may include multiple antennas. For example, one antenna group may include antennas 104 and 106, another antenna group may include antennas 108 and no, and an additional group may include antennas 112 and 114. In FIG. 1, two antennas are shown in each antenna group. However, in each group, more or fewer antennas can be used. The network device 102 may additionally include a transmitter chain and a receiver chain, and a person of ordinary skill in the art may understand that both the transmitter chain and the receiver chain may include multiple components (for example, a processor, a modulator, a multiplexer, a demodulator, a demultiplexer, and an antenna) related to signal sending and receiving.

The network device 102 may communicate with multiple terminal devices (for example, a terminal device 116 and a terminal device 122). However, it may be understood that the network device 102 may communicate with any quantity of terminal devices similar to the terminal device 116 or 122. The terminal devices 116 and 122 may be, for example, a cellular phone, a smartphone, a portable computer, a handheld communications device, a handheld computing device, a satellite radio apparatus, a global positioning system, a PDA, and/or any other suitable devices configured to perform communication on the wireless communications system 100.

As shown in FIG. 1, the terminal device 116 communicates with the antennas 112 and 114, where the antennas 112 and 114 send information to the terminal device 116 by using a forward link 118, and receive information from the terminal device 116 by using a reverse link 120. In addition, the terminal device 122 communicates with the antennas 104 and 106, where the antennas 104 and 106 send information to the terminal device 122 by using a forward link 124, and receive information from the terminal device 122 by using a reverse link 126.

For example, in a frequency division duplex (FDD) system, the forward link 118 may use a frequency band different from that used by the reverse link 120, and the forward link 124 may use a frequency band different from that used by the reverse link 126.

For another example, in a time division duplex (TDD) system and a full duplex system, the forward link 118 and the reverse link 120 may use a common frequency band, and the forward link 124 and the reverse link 126 may use a common frequency band.

Each group of antennas or an area or both that are designed to perform communication are referred to as a sector of the network device 102. For example, the antenna group may be designed to communicate with a terminal device in a sector of coverage of the network device 102. In a process that the network device 102 respectively communicates with the terminal devices 116 and 122 by using the forward links 118 and 124, a transmit antenna of the network device 102 may improve signal-to-noise ratios of the forward links 118 and 124 by means of beamforming. In addition, compared with a manner in which a network device sends signals to all terminal devices of the network device by using a single antenna, when the network device 102 sends, by means of beamforming, signals to the terminal devices 116 and 122 that are randomly scattered in related coverage, relatively little interference is caused to a mobile device in a neighboring cell.

Within a given time, the network device 102, the terminal device 116, or the terminal device 122 may be a wireless communications sending apparatus and/or a wireless communications receiving apparatus. When sending data, the wireless communications sending apparatus may encode data so as to transmit the encoded data. Specifically, the wireless communications sending apparatus may obtain (for example, generate, receive from another communications apparatus, or save in a memory) a particular quantity of data bits that need to be sent to the wireless communications receiving apparatus through a channel. Such data bits may be included in a transport block (or multiple transport blocks) of data, and the transport block may be segmented to generate multiple code blocks.

FIG. 2 is a schematic flowchart of an uplink data transmission method 200 according to an embodiment of the present invention. As shown in FIG. 2, the method 200 may be executed by a network device, for example, a base station. The method 200 includes:

S201: Determine M transmission areas allocated to a terminal device, and generate first information used to indicate the M transmission areas, where M is a positive integer, and the transmission area represents an air interface time-frequency resource that includes a time range and a frequency range that are specified by a communications system.

S202: Determine, for each transmission area of the M transmission areas, second information used to indicate a transport block size.

S203: Send an indication message to the terminal device, so that the terminal device transmits uplink data according to the indication message, where the indication message includes the first information and the second information.

Therefore, in the uplink data transmission method provided in this embodiment of the present invention, at least one transmission area is determined, and related information about a transport block size is assigned to the transmission area, so that a terminal device transmits uplink data on the transmission area by using the corresponding transport block size. Therefore, uplink data can be decoded on a transmission area according to a transport block size. In this way, a processing delay can be reduced.

First, the "transmission area" mentioned in this embodiment of the present invention is described. The transmission area in this embodiment of the present invention may represent an air interface time-frequency resource that includes a time range and a frequency range that are specified by a communications system. The air interface time-frequency resource may be not granted to only a specific terminal device, but instead, a nonspecific terminal device may be allowed to perform non-grant-mode uplink data transmission on the air interface time-frequency resource. In the non-grant-mode uplink data transmission method, a terminal device may directly use a specific time-frequency resource to send uplink data without needing to undergo a process from service requesting to uplink granting by a network device. Certainly, a person skilled in the art may understand that the "transmission area" may be referred to as another name. As shown in FIG. 3, in a same communications system, there may be multiple transmission areas, and any two different transmission areas may overlap in a time range, or may overlap in a frequency range, but cannot overlap in both a time range and a frequency range. That is, any two different transmission areas cannot overlap in an area formed of two-dimensional coordinate space.

In addition, the "data" in this embodiment of the present invention may refer to a signal transmitted through an air interface, a symbol generated after constellation modulation is performed, a symbol generated after codebook modulation is performed, a bit stream, or a signal in another form. For brevity, the foregoing signals and symbols in this embodiment of the present invention are collectively referred to as data.

Specifically, the determining transmission areas that are allocated by a network device to a terminal device in S201 may refer to determining a time resource and a frequency resource of a transmission area that can be used by the terminal device, and a quantity of transmission areas that can be used by the terminal device is M. Optionally, in an embodiment, the first information generated by the network device includes time domain information and frequency domain information of each transmission area of the M transmission areas. That is, the first information used to indicate the M transmission areas may be generated according to time resources and frequency resources of the M transmission areas allocated by the network device to the terminal device. The first information may be a time resource and a frequency resource, or may be, for example, a sequence number/an identifier/an index that indicates a time resource and a frequency resource. The network device may determine one transmission area for the terminal device, or may determine multiple transmission areas for the terminal device, and a quantity of determined transmission areas is not limited in this embodiment of the present invention.

The determining, for each transmission area of the M transmission areas, second information used to indicate a transport block size in S202 may include assigning, to each transmission area, a transport block size or a coding rate used to calculate a transport block size. That is, each transmission area is bound to the assigned transport block size or the assigned coding rate used to calculate a transport block size. When the terminal device and the network device respectively send and receive uplink data on a transmission area, the terminal device and the network device use the transport block size or coding rate assigned to the transmission area. Generally, the network device may assign, to each transmission area, a transport block size or one coding rate used to calculate a transport block size, or may assign, to each transmission area, multiple transport block sizes or multiple coding rates used to calculate transport block sizes. Transport block sizes or coding rates, used to calculate transport block sizes, assigned by the base station to different transmission areas may be the same or different. This is not limited in this embodiment of the present invention. The second information may be a transport block size or a coding rate, or may be a sequence number/an identifier/an index indicating a transport block size or a coding rate. This is not limited in this embodiment of the present invention.

In S203, the network device sends an indication message that includes the first information and the second information to the terminal device. That is, the network device informs the terminal device of the M transmission areas allocated to the terminal device and the second information related to the transport block size of each transmission area of the M transmission areas, so that the terminal device transmits uplink data according to the indication message. Specifically, the terminal device may select N transmission areas from the M transmission areas, and transmit uplink data on each transmission area of the N transmission areas according to a transport block size corresponding to each transmission area of the N transmission areas.

Therefore, in the uplink data transmission method provided in this embodiment of the present invention, at least one transmission area is determined, and related information about a transport block size is assigned to the transmission area, so that a terminal device transmits uplink data on the transmission area by using the corresponding transport block size. Therefore, uplink data can be decoded on a transmission area according to a transport block size. In this way, a processing delay can be reduced.

Optionally, in an embodiment, the second information includes information about a transport block size determined for each transmission area of the M transmission areas; or the second information includes information about a coding rate determined for each transmission area of the M transmission areas, so that the terminal device determines a transport block size according to a quantity of unit time-frequency resources that are in a transmission area and that can be used to transmit data, a modulation order, and the coding rate.

Specifically, the network device may inform, in a form of explicit indication, the terminal device of the transport block size determined for each transmission area. For example, the network device directly sends information about the transport block size to the terminal device. The network device may further inform, in a form of implicit indication, the terminal device of the transport block size determined for each transmission area. For example, the network device sends information about a coding rate to the terminal device. The terminal device may calculate the transport block size according to the coding rate. For example, the terminal device may determine the transport block size according to a quantity of unit time-frequency resources that are in a transmission area and that can be used to transmit data, a modulation order, and a coding rate. The quantity of unit time-frequency resources that are used to transmit data and the modulation order may be preset in the communications system and configured on the network device and the terminal device, or may be notified by the network device to the terminal device, or may be obtained by the terminal device by using another device, and this is not limited in this embodiment of the present invention. A specific calculation manner may be as follows:

The transport block size=the quantity of unit time-frequency resources that are in a transmission area and that can be used to transmit data*the modulation order*the coding rate/a total quantity of elements in a codeword (applicable to a system in which codebook modulation is used); or the transport block size=the quantity of unit time-frequency resources that are in a transmission area and that can be used to transmit data*the modulation order*the coding rate (applicable to a system in which constellation modulation is used). The unit time-frequency resource refers to a minimum time-frequency resource used to transmit one modulation symbol, and is, for example, a resource element (RE) in an Orthogonal Frequency Division Multiplexing (OFDM) system. The modulation order may be obtained according to a quantity of codewords included in a codebook, or obtained according to a quantity of constellation points included in a modulation constellation. The quantity of unit time-frequency resources that are in a transmission area and that can be used to transmit data is obtained by subtracting, from a quantity of all unit time-frequency resources included in the transmission area, a quantity of unit time-frequency resources that are in the transmission area and that are used to send signals (for example, a pilot and hybrid automatic repeat request (HARQ) information) other than the data.

Optionally, in an embodiment, the sending an indication message to the terminal device in S203 includes: carrying the indication message on a broadcast channel, and sending, in a broadcast manner, the indication message to all or some of terminal devices served by the network device; or carrying the indication message on a dedicated control channel, and sending, in a unicast manner, the indication message to one specific terminal device or one specific group of terminal devices served by the network device.

Specifically, manners for carrying and delivering the indication message that is sent by the network device to the terminal device may be, but are not limited to, the following several manners.

For example, an indication message is delivered in a broadcast channel carrying manner. For example, an indication message is carried in system information (SI) by using a broadcast channel (BCH) in an LTE system, and the indication message is sent in a broadcast manner to all or some of the terminal devices served by the network device.

For another example, an indication message is delivered in a dedicated control channel carrying manner. For example, an indication message is carried in a radio resource control reconfiguration (RRCR) message by using a dedicated control channel (DCCH) in an LTE system, and the indication message is sent in a unicast manner to one specific terminal device or one specific group of terminal devices served by the network device.

Optionally, in an embodiment, the method in this embodiment of the present invention may be applicable to a non-orthogonal multiple access technology, for example, an SCMA technology. When the method 200 is applicable to the non-orthogonal multiple access technology, the method 200 further includes: determining at least one codebook-pilot set for each transmission area of the M transmission areas, and generating third information used to indicate the at least one codebook-pilot set, where the indication message further includes the third information, and the codebook-pilot set includes multiple codebooks, multiple pilot sequences, and a combination relationship between a codebook and a pilot sequence.

Before this embodiment is described in detail, the SCMA and the codebook-pilot set that is involved in this embodiment are first described in detail.

The SCMA is a non-orthogonal multiple access technology. In the technology, multiple different data streams are transmitted on a same resource unit by using a codebook (that is, a same resource unit is reused for multiple different data streams), where different codebooks are used for different data streams, thereby achieving an objective of improving resource utilization. Data streams may come from same user equipment or may come from different user equipments.

A codebook used in the SCMA is a set of two or more codewords.

The codeword may be represented as a multidimensional complex vector. The multidimensional complex vector has two or more dimensions, and is used to represent a mapping relationship between data and two or more modulation symbols. The modulation symbol includes at least one zero modulation symbol and at least one non-zero modulation symbol, and the data may be binary bit data or m-ary data.

The codebook includes two or more codewords, where the codewords may be different from each other. The codebook may represent a mapping relationship between a possible data combination of data having a particular length and a codeword in a codebook.

In the SCMA technology, data in a data stream is directly mapped to a codeword, that is, a multidimensional complex vector, in a codebook according to a particular mapping relationship, so as to implement spreading the data onto multiple resource units. The data here may be binary bit data or may be m-ary data. The multiple resource units may be resource units in a time domain, a frequency domain, a space domain, a time-frequency domain, a time-space domain, and a time-frequency-space domain.

A feature sequence in the specification corresponds to a codebook, and includes a zero element and a 1 element. The zero element represents that elements, in corresponding locations of zero elements, of a codeword in a corresponding codebook are all zero. The 1 element represents that elements, in corresponding locations of 1 elements, of a codeword in a corresponding codebook are not all zero or none of the elements are zero. Two or more feature sequences form a feature matrix. It should be understood that the SCMA is only a name, and in the industry, another name may also be used to represent the technology.

A codeword used in the SCMA may have particular sparsity. For example, in the codeword, a quantity of zero elements may be not less than a quantity of non-zero elements, so that a receive end can use a multi-user detection technology to perform decoding of relatively low complexity. Herein, the above mentioned relationship between a quantity of zero elements and a modulation symbol is only description of an example of sparsity, and the present invention is not limited thereto. A ratio of a quantity of zero elements to a quantity of non-zero elements may be arbitrarily set according to a requirement.

The SCMA system can be used as an example of the foregoing communications system 100. In the system 100, multiple users reuse a same time-frequency resource block to perform data transmission. Each resource block includes several resource elements (REs). The RE herein may be a subcarrier-symbol unit in an OFDM technology, or may be a resource unit in a time domain or a frequency domain in another air interface technology. For example, in an SCMA system that includes L terminal devices, available resources are divided into several orthogonal time-frequency resource blocks. Each resource block includes U REs, where the U REs may be at a same location in a time domain. When a terminal device #L sends data, the data to be sent is first divided into data blocks of an S-bit size. A codebook (the codebook is determined and delivered by the network device to the terminal device) is searched to map each data block to a modulation symbol sequence X#L={X#L$_1$, X#L$_2$, . . . , X#L$_U$} that includes U modulation symbols. Each modulation symbol in the sequence corresponds to one RE in a resource block. A signal waveform is then generated according to the modulation symbols. For a data block of an S-bit size, each codebook includes 2S different modulation symbol groups, and the 2S different modulation symbol groups correspond to 2S possible data blocks.

The foregoing codebook may also be referred to as an SCMA codebook, and is an SCMA codeword set. An SCMA codeword is a mapping relationship from an information bit to a modulation symbol. That is, the SCMA codebook is a set of the foregoing mapping relationships.

In addition, in the SCMA, in a group of modulation symbols X#k={X#k$_1$, X#k$_2$, . . . , X#k$_L$} corresponding to each terminal device, at least one symbol is a zero symbol, and at least one symbol is a non-zero symbol. That is, for data of one terminal device, only some REs (at least one RE) of L REs carry the data of the terminal device.

Figure 4:
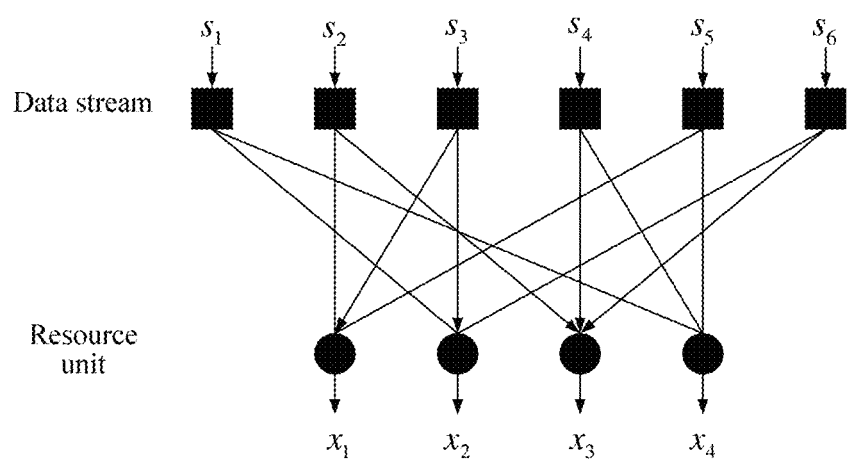
FIG. 4 is a schematic diagram of bit mapping processing of SCMA according to an embodiment of the present invention.

FIG. 4 is a schematic diagram of bit mapping processing (or encoding processing) of SCMA in an example in which four resource units are reused for six data streams. The schematic diagram is a bipartite graph. As shown in FIG. 4, the six data streams form one group, and the four resource units form one encoding unit. One resource unit may be one subcarrier, or one RE, or one antenna port.

In FIG. 4, a connecting line between a data stream and a resource unit represents that at least one data combination of the data stream exists, and after codeword mapping is performed on the data combination, a non-zero modulation symbol is sent on the resource unit. When no connecting line exists between a data stream and a resource unit, it represents that after codeword mapping is performed on all possible data combinations of the data stream, modulation symbols sent on the resource unit are all zero. A data combination of a data stream may be understood according to the following description. For example, in a binary bit data stream, 00, 01, 10, and 11 are all possible two-bit data combinations.

For ease of description, s1 to s6 are used to sequentially represent to-be-sent data combinations of the six data streams in FIG. 4, and x1 to x4 are used to sequentially represent symbols sent on the four resource units in FIG. 4. A connecting line between a data stream and a resource unit represents that after data of the data stream is spread, a modulation symbol is sent on the resource unit, where the modulation symbol may be a zero modulation symbol (corresponding to a zero element), or may be a non-zero modulation symbol (corresponding to a non-zero element). When no connecting line exists between a data stream and a resource unit, it represents that after the data of the data stream is spread, a modulation symbol is not sent on the resource unit.

As can be seen from FIG. 4, after codeword mapping is performed on data of each data stream, modulation symbols are sent on two or more resource units. Meanwhile, a symbol sent on each resource unit is overlay of modulation symbols obtained after codeword mapping is performed on data from two or more data streams. For example, after codeword mapping is performed on a to-be-sent data combination s3 of a data stream 3, non-zero modulation symbols may be sent on a resource unit 1 and a resource unit 2. Data x3 sent on a resource unit 3 is overlay of non-zero modulation symbols obtained after codeword mapping is separately performed on to-be-sent data combinations s2, s4, and s6 of a data stream 2, a data stream 4, and a data stream 6. Because a quantity of data streams may be greater than a quantity of resource units, the SCMA system may effectively improve a network capacity, including a quantity of users that can access the system, spectral efficiency of the system, and the like.

With reference to the foregoing description of a codebook and FIG. 4, a codeword in a codebook usually has the following form:

$$\begin{pmatrix} c_{1,q} \\ c_{2,q} \\ \vdots \\ c_{N,q} \end{pmatrix},$$

and
the corresponding codebook usually has the following form:

$$\left\{ \begin{pmatrix} c_{1,1} \\ c_{2,1} \\ \vdots \\ c_{N,1} \end{pmatrix}, \begin{pmatrix} c_{1,2} \\ c_{2,2} \\ \vdots \\ c_{N,2} \end{pmatrix}, \ldots, \begin{pmatrix} c_{1,Q_m} \\ c_{2,Q_m} \\ \vdots \\ c_{N,Q_m} \end{pmatrix} \right\},$$

where
N is a positive integer greater than 1, and may represent a quantity of resource units included in one encoding unit, or may be understood as a length of a codeword; $Q_m$ is a positive integer greater than 1, represents a quantity of codewords included in a codebook, and corresponds to a modulation order. For example, during sampling of quadrature phase shift keying (QPSK, Quadrature Phase Shift Keying) or $4^{th}$-order modulation, $Q_m$ is 4; q is a positive integer, and $1 \leq q \leq Q_m$; an element $c_{n,q}$ included in a codebook and a codeword is a complex number, and $c_{n,q}$ may be mathematically represented as:

$$c_{n,q} \in \{0, \alpha^* \exp(j^*\beta)\}, 1 \leq n \leq N, 1 \leq q \leq Q_m, \text{ where}$$

$\alpha$ and $\beta$ may be any real numbers, and N and $Q_m$ may be positive integers.

A particular mapping relationship may be formed between a codeword in a codebook and data. For example, the following mapping relationship may be formed between a codeword in a codebook and a two-bit data combination of a binary data stream.

For example, "00" may correspond to a codeword 1, that is, $$\begin{pmatrix} c_{1,1} \\ c_{2,1} \\ \vdots \\ c_{N,1} \end{pmatrix},$$

"01" may correspond to a codeword 2, that is, $$\begin{pmatrix} c_{1,2} \\ c_{2,2} \\ \vdots \\ c_{N,2} \end{pmatrix},$$

"10" may correspond to a codeword 3, that is, $$\begin{pmatrix} c_{1,3} \\ c_{2,3} \\ \vdots \\ c_{N,3} \end{pmatrix},$$

and
"11" may correspond to a codeword 4, that is, $$\begin{pmatrix} c_{1,4} \\ c_{2,4} \\ \vdots \\ c_{N,4} \end{pmatrix}.$$

With reference to the foregoing FIG. 4, when a connecting line exists between a data stream and a resource unit, a codebook corresponding to the data stream and a codeword in the codebook should have the following characteristics: For at least one codeword in the codebook, a non-zero modulation symbol is sent on the corresponding resource unit. For example, a connecting line exists between the data stream 3 and the resource unit 1, and at least one codeword in a codebook corresponding to the data stream 3 meets $c_{1,q} \neq 0$, where $1 \leq q \leq Q_m$.

When no connecting line exists between a data stream and a resource unit, a codebook corresponding to the data stream and a codeword in the codebook should have the following characteristics: For all codewords in the codebook, zero modulation symbols are sent on the corresponding resource unit. For example, no connecting line exists between the data stream 3 and the resource unit 3, and any codeword in a codebook corresponding to the data stream 3 meets $C_{3,q}=0$, where $1 \leq q \leq Q_m$.

In conclusion, when a modulation order is QPSK, the codebook corresponding to the data stream 3 in the foregoing FIG. 4 may have the following form and characteristics:

$$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\},$$

where
$C_{n,q}=\alpha*\exp(j*\beta)$, $1 \leq n \leq 2, 1 \leq q \leq 4$, and $\alpha$ and $\beta$ may be any real number. For any q, $1 \leq q \leq 4$. $c_{1,q}$ and $c_{2,q}$ are not all zero at the same time. At least one group of $q_1$ and $q_2$ meets $c_{1,q_1} \neq 0$ and $c_{2,q_2} \neq 0$, where $1 \leq q_1$, and $q_2 \leq 4$.

For example, if the data s3 of the data stream 3 is "10", according to the foregoing mapping rule, the data combination is mapped to a codeword, that is, a four-dimensional complex vector:

$$\begin{pmatrix} c_{1,3} \\ c_{2,3} \\ 0 \\ 0 \end{pmatrix}.$$

Further, in the SCMA system, the bipartite graph may also be represented by using a feature matrix. The feature matrix may have the following form:

$$\begin{pmatrix} r_{1,1} & r_{1,2} & \cdots & r_{1,M} \\ r_{2,1} & r_{2,2} & \cdots & r_{2,M} \\ \vdots & \vdots & \cdots & \vdots \\ r_{N,1} & r_{N,2} & \cdots & r_{N,M} \end{pmatrix}_{N \times M},$$

where
$r_{n,m}$ represents an element in the feature matrix, m and n are natural numbers, where $1 \leq n \leq N$, $1 \leq m \leq M$, N rows separately represent N resource units in one encoding unit, and M columns separately represent a quantity of reused data streams. Although the feature matrix may be expressed in a universal form, the feature matrix may have the following feature.

(1) An element in the feature matrix $r_{n,m} \in \{0,1\}$, $1 \leq n \leq N$, $1 \leq m \leq M$, and $r_{n,m}=1$ may represent that as explained by using a corresponding bipartite graph, a connecting line exists between an $m^{th}$ data stream and a resource unit n, or it may be understood that a non-zero modulation symbol is obtained after codeword mapping is performed on at least one data combination of the $m^{th}$ data stream; $r_{n,m}=0$ may represent that as explained by using a corresponding bipartite graph, no connecting line exists between the $m^{th}$ data stream and the resource unit n, or it may be understood that only zero modulation symbols are obtained after codeword mapping are performed on all possible data combinations of the $m^{th}$ data stream.

2) Further optionally, in the feature matrix, a quantity of 0 elements may be not less than a quantity of 1 elements, so that a characteristic of sparse encoding is reflected.

Meanwhile, a column in the feature matrix may be referred to as a feature sequence. The feature sequence may have the following expression form:

$$\begin{pmatrix} r_{1,m} \\ r_{2,m} \\ \vdots \\ r_{N,m} \end{pmatrix}, 1 \leq m \leq M.$$

Therefore, the feature matrix may also be regarded as a matrix formed of a series of feature sequences.

With reference to the feature description of the foregoing feature matrix, for the example shown in FIG. 4, a corresponding feature matrix may be represented as:

$$\begin{pmatrix} 0 & 1 & 1 & 0 & 1 & 0 \\ 1 & 0 & 1 & 0 & 0 & 1 \\ 0 & 1 & 0 & 1 & 0 & 1 \\ 1 & 0 & 0 & 1 & 1 & 0 \end{pmatrix}.$$

A feature sequence corresponding to the codebook $$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\}$$

used for the data stream 3 in FIG. 4 may be represented as:

$$\begin{pmatrix} 1 \\ 1 \\ 0 \\ 0 \end{pmatrix}.$$

Therefore, as can be considered, a correspondence between a codebook and a feature sequence is a one-to-one relationship, that is, one codebook uniquely corresponds to one feature sequence. A correspondence between a feature sequence and a codebook may be a one-to-multiple relationship, that is, one feature sequence corresponds to one or more codebooks. Therefore, the feature sequence may be understood as: A feature sequence corresponds to a codebook, and includes a zero element and a 1 element. A location of the zero element represents that elements, at corresponding locations of zero elements, of the codeword in the corresponding codebook are all zero. The 1 element represents that elements, at corresponding locations of 1 elements, of the codeword in the corresponding codebook are not all zero or none of the elements are zero. The correspondence between a feature sequence and a codebook may be determined by using the following two conditions.

(1) A codeword in a codebook and a corresponding feature sequence have a same total quantity of elements.

(2) For a location of any element whose value is 1 in a feature sequence, at least one codeword can be found in a corresponding codebook, so that an element, at the same location, of the codeword is not zero. For a location of any element whose value is zero in a feature sequence, elements, at the same location, of all codewords in a corresponding codebook are zero.

It should be further understood that in the SCMA system, a codebook may be directly represented and stored. For example, the foregoing codebook or each codeword in the codebook is stored, or only an element at a location whose corresponding feature sequence element is 1 in a codeword is stored. Therefore, during application of the present invention, it needs to be assumed that in the SCMA system, both a base station and user equipment may store some or all of the following content that is designed in advance.

(1) One or more SCMA feature matrices:

$$\begin{pmatrix} r_{1,1} & r_{1,2} & \cdots & r_{1,M} \\ r_{2,1} & r_{2,2} & \cdots & r_{2,M} \\ \vdots & \vdots & \cdots & \vdots \\ r_{N,1} & r_{N,2} & \cdots & r_{N,M} \end{pmatrix}_{N \times M},$$

where $r_{n,m} \in \{0,1\}$, $1 \le n \le N$, $1 \le m \le M$, and M and N are both integers greater than 1, where M represents a quantity of reused data streams, N is a positive integer greater than 1, and may represent a quantity of resource units included in one encoding unit, or may be understood to represent a length of a codeword.

(2) One or more SCMA feature sequences:

$$\begin{pmatrix} r_{1,m} \\ r_{2,m} \\ \vdots \\ r_{N,m} \end{pmatrix},$$

where $Q_m \ge 2$, $Q_m$ may be a modulation order corresponding to the codebook, and each codebook may correspond to one modulation order, where N is a positive integer greater than 1, and may represent a quantity of resource units included in one encoding unit, or may be understood to represent a length of a codeword.

(3) One or more SCMA codebooks:

$$\left\{ \begin{pmatrix} c_{1,1} \\ c_{2,1} \\ \vdots \\ c_{N,1} \end{pmatrix}, \begin{pmatrix} c_{1,2} \\ c_{2,2} \\ \vdots \\ c_{N,2} \end{pmatrix}, \cdots, \begin{pmatrix} c_{1,Q_m} \\ c_{2,Q_m} \\ \vdots \\ c_{N,Q_m} \end{pmatrix} \right\},$$

where $Q_m \ge 2$, $Q_m$ may be a modulation order corresponding to the codebook, and each codebook may correspond to one modulation order, where N is a positive integer greater than 1, and may represent a quantity of resource units included in one encoding unit, or may be understood to represent a length of a codeword.

It should be understood that the SCMA system discussed above is only an example of a communications system applicable to the data transmission method and apparatus of the present invention, and the present invention is not limited thereto. Any other communications system that can enable a terminal device to reuse a same time-frequency resource within a same period of time to perform data transmission falls within the protection scope of the present invention.

A codebook in an SCMA system is used as an example below to describe a codebook-pilot set in detail. That is, a codebook is a sparse code multiple access SCMA codebook. The codebook includes two or more codewords, the codeword is a multidimensional complex vector and is used to represent a mapping relationship between data and at least two modulation symbols, and the at least two modulation symbols include at least one zero modulation symbol and at least one non-zero modulation symbol.

The codebook-pilot set includes multiple SCMA codebooks, multiple pilot sequences, and a combination relationship between a codebook and a pilot. The combination relationship between a codebook and a pilot sequence is a combination formed of each pilot sequence in the codebook-pilot set and one or more codebooks in the codebook-pilot set.

The pilot sequence and the SCMA codebook are an uplink pilot sequence and an SCMA codebook that are used to allow a terminal to send uplink data based on a non-grant mode, pilot sequences in a same codebook-pilot set are different from each other, and codewords of different codebooks that belong to a same codebook-pilot set have a same quantity of elements (including a zero element and a non-zero element). Each pilot sequence in the codebook-pilot set is combined with one or more SCMA codebooks in the codebook-pilot set to form a specific combination of a codebook and a pilot.

In this embodiment of the present invention, when a terminal device selects a combination of a codebook and a pilot in a codebook-pilot set, the terminal device generates and sends an uplink pilot signal by using a pilot sequence corresponding to the combination, and modulates one or more data streams of a user by using one or more SCMA codebooks corresponding to the combination, where each data stream corresponds to one SCMA codebook, and uplink SCMA data is generated and sent.

An example of a possible combination relationship between a codebook and a pilot in a codebook-pilot set is provided below. As shown in Table 1, it is assumed that a codebook-pilot set has L (L is an integer greater than 1) pilot sequences in total, which are separately denoted as $P_1, P_2, \ldots,$ and $P_L$, and has $$K = \sum_{i=1}^{L} Ki$$

SCMA codebooks in total, which are denoted as $C_{i,j}$, where Ki is an integer greater than or equal to 1, $1 \leq i \leq L$, and $1 \leq j \leq Ki$. Generally, for any $1 \leq i \leq L$, when $1 \leq j_1 \neq j_2 \leq K_i$, $C_{i,j_1}$ is different from $C_{i,j_2}$; and for any $1 \leq i_1 \neq i_2 \leq L$, where $1 \leq j_1 \leq K_i$, and $1 \leq j_2 \leq K_2$, $C_{i,j_1}$ and $C_{i_2,j_2}$ may be the same or may be different.

TABLE 1

Combination relationship between a codebook and a pilot in a codebook-pilot set

| Sequence number | {pilot, {codebook}} |
|---|---|
| 1 | $\{P_1, \{C_{1,1}, C_{1,2}, \ldots, C_{1,K_1}\}\}$ |
| 2 | $\{P_2, \{C_{2,1}, C_{2,2}, \ldots, C_{2,K_2}\}\}$ |
| ... | |
| L | $\{P_L, \{C_{L,1}, C_{L,2}, \ldots, C_{L,K_L}\}\}$ |

The codebook-pilot set may be predefined and stored on a network device and a terminal device. One or more codebook-pilot sets may be stored on the network device and the terminal device. Generally, codewords in codebooks that belong to different codebook-pilot sets have different quantities of elements (including a zero element and a non-zero element).

In this embodiment of the present invention, that the network device determines a codebook-pilot set for each transmission area of the M transmission areas refers to binding each transmission area to an assigned codebook-pilot set. When the network device and the terminal device respectively send and receive uplink data on a transmission area, a codebook and a pilot in a codebook-pilot set assigned to the transmission area are used. Generally, the network device may assign one codebook-pilot set to each transmission area, or may assign multiple codebook-pilot sets to each transmission area. The network device may assign a same codebook-pilot set or different codebook-pilot sets for different transmission areas. That is, the network device may determine at least one codebook-pilot set for each transmission area, and generate third information used to indicate the at least one codebook-pilot set.

It should be understood, this embodiment of the present invention is applicable to a system that uses a codebook to perform modulation, and the system is, for example, an SCMA system or a low density signature (LDS) system. The third information used to indicate a codebook-pilot set may be information that directly indicates a combination of a codebook and a pilot (applicable to the SCMA system), or may be information that indicates a combination of a modulation constellation, a signature sequence, and a pilot, so that a codebook is determined by using the modulation constellation and the signature sequence, so as to further indicate a combination of the codebook and the pilot (applicable to the LDS system). This is not limited in this embodiment of the present invention.

It should be further understood that the third information may include content similar to that of the codebook-pilot set shown in Table 1. In a more common processing method, multiple codebook-pilot sets similar to the codebook-pilot set shown in Table 1 are stored on both the network device and the terminal device, and only an index used to indicate a codebook-pilot set is transmitted in the third information. The index may also be a sequence number or an identifier, which is used to indicate a codebook-pilot set. Preferably, the third information includes an index of at least one codebook-pilot set. For example, the codebook-pilot sets are indexed, an index, which is determined by the network device, of at least one codebook-pilot set is used as the third information, and the third information is sent to the terminal device by sending an indication message.

In this embodiment of the present invention, that the network device sends, to the terminal device, an indication message corresponding to a transmission area may be implemented in the following manner, but the present invention is not limited thereto. A form of the indication message is:

```
GrantFreeTransAreaList:: =   SEQUENCE (SIZE (1..maxGrantFreeTransArea)) OF
    GrantFreeTransAreaInfo
        GrantFreeTransAreaInfo:: =    SEQUENCE {
            timeDomainAssign              BIT STRING (SIZE(X)),
            freqDomainAssign              BIT STRING (SIZE(Y)),
```

```
        pilot-CodebookAssign              BIT STRING (SIZE(Z)),
        transportBlockSizeAssign          BIT STRING (SIZE(S)),
    }
        or
    GrantFreeTransAreaList:: =    SEQUENCE (SIZE (1..maxGrantFreeTransArea))
OF GrantFreeTransAreaInfo
    GrantFreeTransAreaInfo:: =    SEQUENCE {
        timeDomainAssign                  BIT STRING (SIZE(X)),
        freqDomainAssign                  BIT STRING (SIZE(Y)),
        pilot-CodebookAssign          BIT STRING (SIZE(Z)),
        codeRateAssign                    BIT STRING (SIZE(S)),
    }
```

GrantFreeTransAreaList is a list of transmission areas, and includes M transmission areas; maxGrantFreeTransArea is a maximum value M of a quantity of transmission areas; timeDomainAssign is used to indicate a time domain resource of a transmission area, a form of a bit string can be used, each bit represents one subframe, a bit being 1 represents that the transmission area is located in the subframe, and a bit being 0 represents that the transmission area is not located in the subframe; and freqDomainAssign is used to indicate a frequency domain resource of a transmission area, and a form of a bit string can be used to indicate a resource block occupied by the transmission area. Correspondingly, the first information includes a first bit string used to indicate a subframe of a time domain of each transmission area of the M transmission areas and a second bit string used to indicate a resource block of a frequency domain of each transmission area of the M transmission areas.

The pilot-CodebookAssign is used to indicate a codebook-pilot set assigned to a transmission area, and a form of a bit string can be used to indicate an index of the assign codebook-pilot set; transportBlockAssign is used to indicate a transport block size assigned to a transmission area, and a form of a bit string can be used to indicate an index of the assigned transport block size; and codeRateAssign is used to indicate a coding rate that is assigned to a transmission area and that is used to calculate a transport block size, and a form of a bit string can be used to indicate an index of the assigned coding rate. Correspondingly, the second information includes an index of the transport block size determined for each transmission area of the M transmission areas; or the second information includes an index of the coding rate determined for each transmission area of the M transmission areas.

When the indication message is sent in the foregoing manner, at least one predefined codebook-pilot set needs to be stored on the network device and the terminal device. Moreover, the stored codebook-pilot set is numbered, and at the same time, an index of a transport block size in Table 2 or an index of a coding rate in Table 3 below needs to be stored on the network device and the terminal device.

TABLE 2

Table of an index of a transport block size

| Index of a transport block size | Transport block size |
|---|---|
| ... | ... |
| x | z |
| ... | ... |

TABLE 3

Table of an index of a coding rate

| Index of a coding rate | Coding rate |
|---|---|
| ... | ... |
| p | q |
| ... | ... |

In the foregoing Table 2 and Table 3, x, y, z, and p are non-negative integers, and q is a real number between 0 and 1.

In the foregoing embodiment, the coding rate and the codebook-pilot set may be further indicated in an enumeration manner. For example,

| pilot-CodebookAssign | ENUMERATED {set-1, set-2, set-3, ...} |
| codeRateAssign | ENUMERATED {cr-r1, cr-r2, cr-r3, ...}; | where pilot-CodebookAssign is used to indicate a codebook-pilot set assigned to a transmission area, where set-1 represents a codebook-pilot set 1, set-2 represents a codebook-pilot set 2, and so on; and codeRateAssign is used to indicate a coding rate that is assigned to a transmission area and that is used to calculate a transport block size, where cr-r1 represents a coding rate r1, cr-r2 represents a coding rate r2, and so on.

In addition, in this embodiment of the present invention, the transport block size may be further indicated in the following manner. For example:

| transportBlockSizeAssign | TransportBlockSize; | where
transportBlockAssign is used to indicate a transport block size assigned to a transmission area, where for the transport block size, refer to a protocol used in a system.

In the foregoing embodiment, the time domain information of the transmission area may be further indicated in the following manner. For example:

| timeDomainAssign | BIT STRING (SIZE(X)) |
| timeDomainPeriod | ENUMERATED {rf-p1, rf-p2, rf-p3, ...} |
| timeDomainOffset | INTEGER (o..Max); | where
timeDomainAssign is used to indicate a time domain resource of a transmission area, where a form of a bit string can be used, each bit represents one subframe, a bit being 1 represents that the transmission area is located in the subframe, and a bit being 0 represents that the transmission area is not located in the subframe; timeDomainPeriod is used to indicate a period of a transmission area, where if a current radio frame meets a condition mod (current radio frame number, timeDomainPeriod)=timeDomainOffset, timeDomainAssign indicates whether the transmission area is located on X consecutive subframes starting from a $0^{th}$ subframe of a current radio frame, where rf-p1 represents p1 radio frames, rf-p2 represents p2 radio frames, and so on; and timeDomainOffset is used to indicate a radio frame offset of a transmission area, where if a current radio frame meets a condition mod(current radio frame number, timeDomainPeriod)=timeDomainOffset, timeDomainAssign indicates whether the transmission area is located on X consecutive subframes starting from a $0^{th}$ subframe of a current radio frame.

Optionally, in another embodiment, in a system in which a constellation is used to perform modulation, for example, a Code Division Multiple Access (CDMA) system, an Orthogonal Frequency Multiple Access (OFDMA) system, a Long Term Evolution (LTE) system, an Orthogonal Frequency Division Multiplexing (OFDM) system, a Generalized Frequency Division Multiplexing (GFDM) system, or a Filtered-Orthogonal Frequency Division Multiplexing (F-OFDM) system, the network device does not send, to the terminal device, the third information that indicates a codebook-pilot set, but instead, sends information that indicates a constellation-pilot set, or the network device and the terminal device store a constellation-pilot set, so that the terminal device selects a corresponding combination of a constellation and a pilot.

The constellation-pilot set may also be referred to as a constellation-pilot combination relationship list, where a pilot sequence and a modulation constellation are combined, to form one or more specific combinations of a modulation constellation and a pilot sequence. It is assumed that there are L uplink pilot sequences used to allow the terminal device to send uplink data based on a non-grant mode, where the L uplink pilot sequences are separately numbered from 1 to L, and there are J modulation constellations used to allow the terminal device to send uplink data based on a non-grant mode, where the J modulation constellations are separately numbered from 1 to J. Generally, L=K*J+j, where K is an integer greater than or equal to 1, and j is a non-negative integer less than J. Table 4 gives a possible combination relationship between a constellation and a pilot. There are L combinations in total. In different combinations, pilot sequences are different from each other, and modulation constellations may be the same.

TABLE 4

| | Constellation-pilot set | | | | |
|---|---|---|---|---|---|
| Sequence number | {Pilot, constellation} | Sequence number | {Pilot, constellation} | ... Sequence number | {Pilot, constellation} |
| 1 | $\{P_1, C_1\}$ | J + 1 | $\{P_{J+1}, C_1\}$ | ... K * J + 1 | $\{P_{K*J+1}, C_1\}$ |
| 2 | $\{P_2, C_2\}$ | J + 2 | $\{P_{J+2}, C_2\}$ | ... | . |
| | | | . | ... K * J + j | $\{P_{K*J+j}, C_j\}$ |
| | | | . | | |
| J | $\{P_J, C_J\}$ | 2 * J | $\{P_{2*J}, C_J\}$ | ... | |

The constellation-pilot set may be predefined and stored on the network device and the terminal device. Because a quantity of combination relationships between a constellation and a pilot is less than a quantity of combination relationships between a codebook and a pilot, generally, the network device and the terminal device separately need to store only a constellation-pilot set.

It should be understood that the nouns such as the transmission area, the codebook-pilot set, and the constellation-pilot set that are involved in this embodiment of the present invention may appear in other different forms in different scenarios or systems, that is, may be varied by using various equivalent changes or replacements, and these changes or replacements should fall within the protection scope of the present invention.

Similar to the foregoing description, in this embodiment of the present invention, an indication message that is sent by the network device to the terminal device that corresponds to a transmission area may be implemented in the following manner, but the present invention is not limited thereto. A form of the indication message is:

```
GrantFreeTransAreaList:: =    SEQUENCE (SIZE (1..maxGrantFreeTransArea))
  OF GrantFreeTransAreaInfo
       GrantFreeTransAreaInfo:: =    SEQUENCE {
          timeDomainAssign              BIT STRING (SIZE(X)),
          freqDomainAssign              BIT STRING (SIZE(Y)),
```

```
            transportBlockSizeAssign           BIT STRING (SIZE(S)),
        }
    or
        GrantFreeTransAreaList:: =   SEQUENCE (SIZE (1..maxGrantFreeTransArea))
OF GrantFreeTransAreaInfo
        GrantFreeTransAreaInfo:: =   SEQUENCE {
            timeDomainAssign                  BIT STRING (SIZE(X)),
            freqDomainAssign                  BIT STRING (SIZE(Y)),
            codeRateAssign                    BIT STRING (SIZE(S)),
        }
```

GrantFreeTransAreaList is a list of transmission areas, and includes M transmission areas; maxGrantFreeTransArea is a maximum value M of a quantity of transmission areas; timeDomainAssign is used to indicate a time domain resource of a transmission area, a form of a bit string can be used, each bit represents one subframe, a bit being 1 represents that the transmission area is located in the subframe, and a bit being 0 represents that the transmission area is not located in the subframe; freqDomainAssign is used to indicate a frequency domain resource of a transmission area, and a form of a bit string can be used to indicate a resource block occupied by the transmission area; transportBlockAssign is used to indicate a transport block size assigned to a transmission area, and a form of a bit string can be used to indicate an index of the assigned transport block size; and codeRateAssign is used to indicate a coding rate that is assigned to a transmission area and that is used to calculate a transport block size, and a form of a bit string can be used to indicate an index of the assigned coding rate.

When the indication message is sent in the foregoing manner, an index of a transport block size in Table 5 or an index of a coding rate in Table 6 below needs to be stored on the network device and the terminal device.

TABLE 5

Table of an index of a transport block size

| Index of a transport block size | Transport block size |
|---|---|
| ... | ... |
| X | z |
| ... | ... |

TABLE 6

Table of an index of a coding rate

| Index of a coding rate | Coding rate |
|---|---|
| ... | ... |
| p | q |
| ... | ... |

In the foregoing Table 2 and Table 3, x, y, z, and p are non-negative integers, and q is a real number between 0 and 1.

In the foregoing embodiment, the coding rate may be further indicated in an enumeration manner. For example:

```
    codeRateAssign    ENUMERATED {cr-r1, cr-r2, cr-r3,...};
``` where codeRateAssign is used to indicate a coding rate that is assigned to a transmission area and that is used to calculate a transport block size, where cr-r1 represents a coding rate r1, cr-r2 represents a coding rate r2, and so on.

In addition, in this embodiment of the present invention, the transport block size may be further indicated in the following manner. For example:

```
    transportBlockSizeAssign       TransportBlockSize;
``` where transportBlockAssign is used to indicate a transport block size assigned to a transmission area, where for the transport block size, refer to a protocol used in a system.

In the foregoing embodiment, the time domain information of the transmission area may be further indicated in the following manner. For example:

```
        timeDomainAssign     BIT STRING (SIZE(X))
        timeDomainPeriod     ENUMERATED {rf-p1, rf-p2, rf-p3,
    ...}
        timeDomainOffset     INTEGER (o..Max);
``` where timeDomainAssign is used to indicate a time domain resource of a transmission area, where a form of a bit string can be used, each bit represents one subframe, a bit being 1 represents that the transmission area is located in the subframe, and a bit being 0 represents that the transmission area is not located in the subframe; timeDomainPeriod is used to indicate a period of a transmission area, where if a current radio frame meets a condition mod(current radio frame number, timeDomainPeriod)=timeDomainOffset, timeDomainAssign indicates whether the transmission area is located on X consecutive subframes starting from a 0th subframe of a current radio frame, where rf-p1 represents p1 radio frames, rf-p2 represents p2 radio frames, and so on; and timeDomainOffset is used to indicate a radio frame offset of a transmission area, where if a current radio frame meets a condition mod(current radio frame number, timeDomainPeriod)=timeDomainOffset, timeDomainAssign indicates whether the transmission area is located on X consecutive subframes starting from a 0th subframe of a current radio frame.

In this embodiment of the present invention, after receiving an indication message sent by a network device, the terminal device selects N transmission areas from the M transmission areas according to the indication message, determines transport block sizes of the transmission areas, and sends, on the selected N transmission areas, uplink data to the network device according to the transport block sizes of the transmission areas, where N is a positive integer less than or equal to M. Specific implementation is described below in detail, and details are no longer described herein.

Optionally, in an embodiment, the method 200 further includes: receiving uplink data that is sent by the terminal device on N transmission areas according to transport block sizes of the N transmission areas, where N is a positive integer less than or equal to M; and decoding the uplink data on the N transmission areas according to the transport block sizes of the N transmission areas.

Specifically, the network device receives data on a time-frequency resource corresponding to a transmission area, tries some or all of codebook-pilot combinations in a codebook-pilot set bound to the transmission area, and decodes the uplink data sent by the terminal device. According to information (a transport block size or a coding rate) that is determined when the indication message is determined and that indicates a transport block size, the network device performs decoding according to the transport block sizes of the transmission areas.

It should be understood that in this embodiment of the present invention, the transmission area, the transport block size assigned to the transmission area or the coding rate that is assigned to the transmission area and that is used to calculate a transport block size, and the codebook-pilot set assigned to the transmission area are not constant, and the network device may redetermine a transmission area according to an actual case, where transmission areas determined twice successively are at least different on a time or frequency resource. Alternatively, a transport block size or a coding rate used to calculate a transport block size is assigned to the transmission area again, where different transport block sizes or coding rates are assigned twice successively. Alternatively, a codebook-pilot set is assigned to the transmission area again, where different codebook-pilot sets are assigned twice successively. When the transmission area, or the transport block size assigned to the transmission area or the coding rate that is assigned to the transmission area and that is used to calculate the transport block size, or the codebook-pilot set assigned to the transmission area is changed, the network device needs to resend a new indication message to the terminal device. The new indication message includes the following content: at least one transmission area, a transport block size assigned to each transmission area or a coding rate that is assigned to each transmission area and that is used to calculate a transport block size, and a codebook-pilot set assigned to each transmission area.

In this embodiment of the present invention, by means of the following technologies, after decoding data from different terminal devices, the network device can distinguish which terminal device the data is from. For example, a terminal device sends an identifier such as a radio network temporary identity (RNTI) of the terminal device to the network device, where the identifier is used as a part of data or is scrambled in data. After decoding the data, the network device determines, according to the identifier in the data, which terminal device the data is from. In addition to the foregoing method, an objective of distinguishing, by a base station, which terminal device the data is from may be further implemented by using another method, and this is not limited in this embodiment of the present invention.

Therefore, in the uplink data transmission method provided in this embodiment of the present invention, at least one transmission area is determined, and related information about a transport block size is assigned to the transmission area, so that a terminal device transmits uplink data on the transmission area by using the corresponding transport block size. Therefore, uplink data can be decoded on a transmission area according to a transport block size. In this way, a processing delay can be reduced.

The uplink data transmission methods according to the embodiments of the present invention are described above in detail with reference to FIG. 1 to FIG. 4 from the perspective of a network device. The uplink data transmission method according to an embodiment of the present invention is described below in detail with reference to FIG. 5 from the perspective of a terminal device.

Figure 5:
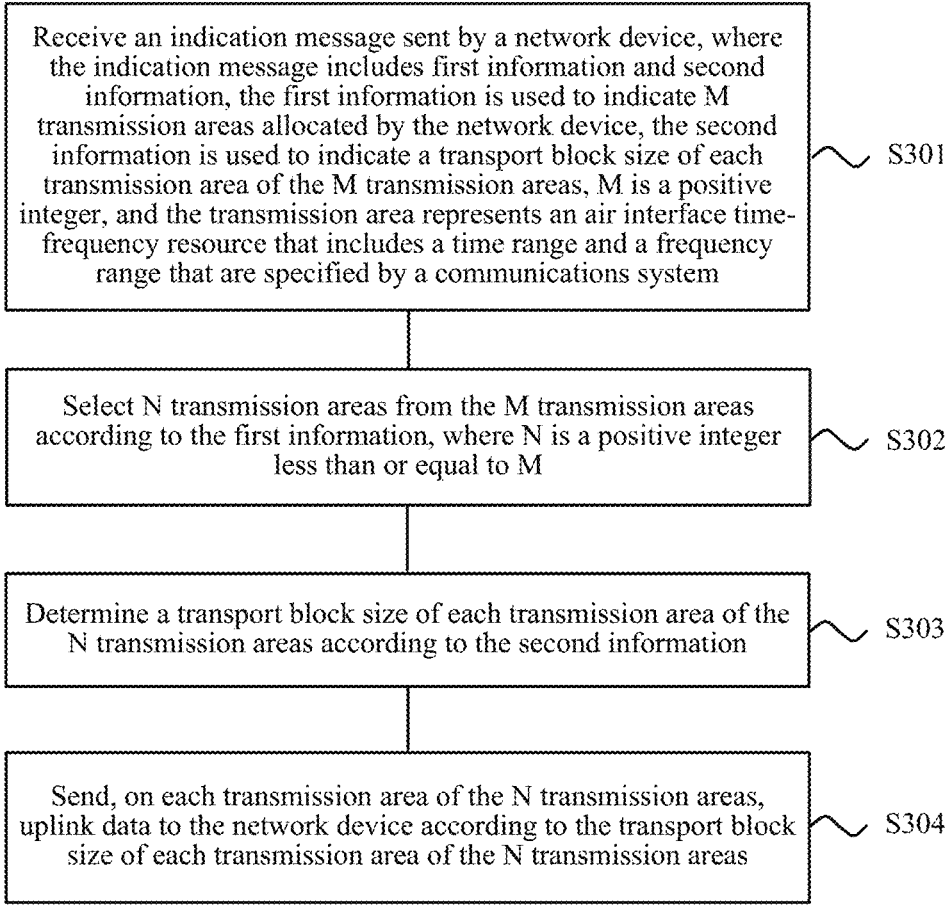
FIG. 5 is a schematic flowchart of an uplink data transmission method according to an embodiment of the present invention.

FIG. 5 is a schematic flowchart of an uplink data transmission method 300 according to an embodiment of the present invention. As shown in FIG. 5, the method 300 is executed by a terminal device. The method 300 includes the following steps.

S301: Receive an indication message sent by a network device, where the indication message includes first information and second information, the first information is used to indicate M transmission areas allocated by the network device, the second information is used to indicate a transport block size of each transmission area of the M transmission areas, M is a positive integer, and the transmission area represents an air interface time-frequency resource that includes a time range and a frequency range that are specified by a communications system.

S302: Select N transmission areas from the M transmission areas according to the first information, where N is a positive integer less than or equal to M.

S303: Determine a transport block size of each transmission area of the N transmission areas according to the second information.

S304: Send, on each transmission area of the N transmission areas, uplink data to the network device according to the transport block size of each transmission area of the N transmission areas.

Therefore, in the uplink data transmission method provided in this embodiment of the present invention, at least one transmission area is selected, and uplink data is transmitted according to related information about a transport block size assigned to the transmission area. Therefore, a network device can decode uplink data on a transmission area according to a transport block size. In this way, a processing delay can be reduced.

Specifically, in S301, the terminal device receives the indication message sent by the network device, and the indication message includes information indicating M transmission areas that can be selected and used by the terminal device, and further includes information indicating a transport block size of each transmission area of the M transmission areas. The terminal device may learn, from the indication message delivered by the network device, information such as a time-frequency resource used to send uplink data by using a non-grant mode, and a transport block size or a coding rate used to calculate a transport block size.

In S302, the terminal device selects N transmission areas from the M transmission areas according to the first information, where N is a positive integer less than or equal to M. The terminal device may select a transmission area by using a random method, or may select a transmission area according to factors such as a data buffer status of the terminal device, a channel condition of a transmission area, a transport block size or a coding rate assigned to a transmission area, and a codebook-pilot set assigned to a transmission area. For example, the terminal device selects a transmission area having a relatively desirable channel condition, or selects a transmission area in which a transport block size matches a data buffer status. In addition to the foregoing method, the terminal device may further select a transmission area by using another method, and this is not limited in this embodiment of the present invention.

In S303, the terminal device determines the transport block sizes of the N transmission areas according to the second information. If the second information included in the indication message is a transport block size that is in a form of explicit indication and that is determined for each transmission area, the terminal device may directly use the transport block size. If the second information included in the indication message is a transport block size that is in a form of implicit indication and that is determined for each transmission area, for example, information of a coding rate is sent to the terminal device, the terminal device may calculate the transport block size according to the coding rate.

In S304, the terminal device sends, on each transmission area of the N transmission areas, uplink data to the network device according to the transport block size of each transmission area.

Therefore, in the uplink data transmission method provided in this embodiment of the present invention, at least one transmission area is selected, and uplink data is transmitted according to related information about a transport block size assigned to the transmission area. Therefore, a network device can decode uplink data on a transmission area according to a transport block size. In this way, a processing delay can be reduced.

Optionally, in an embodiment, the second information includes information about a transport block size that is determined by the network device for each transmission area of the M transmission areas; or the second information includes information about a coding rate that is determined by the network device for each transmission area of the M transmission areas, and the determining a transport block size of each transmission area of the N transmission areas according to the second information includes: determining the transport block size of each transmission area of the N transmission areas according to a quantity of unit time-frequency resources that are in each transmission area of the N transmission areas and that can be used to transmit data, a modulation order, and the coding rate.

Specifically, if the second information included in the indication message is a transport block size that is in a form of explicit indication and that is determined for each transmission area, the terminal device may directly use the transport block size. If the second information included in the indication message is a transport block size that is in a form of implicit indication and that is determined for each transmission area, for example, information of a coding rate is sent to the terminal device, the terminal device may calculate the transport block size according to the coding rate. For example, the terminal device may determine the transport block size according to a quantity of unit time-frequency resources that are in a transmission area and that can be used to transmit data, a modulation order, and a coding rate. A specific calculation manner may be as follows.

The transport block size=the quantity of unit time-frequency resources that are in a transmission area and that can be used to transmit data*the modulation order*the coding rate/a total quantity of elements in a codeword (applicable to a system in which codebook modulation is used); or the transport block size=the quantity of unit time-frequency resources that are in a transmission area and that can be used to transmit data*the modulation order*the coding rate (applicable to a system in which constellation modulation is used). The unit time-frequency resource refers to a minimum time-frequency resource used to transmit one modulation symbol, and is, for example, a resource element (RE) in an Orthogonal Frequency Division Multiplexing (OFDM) system. The modulation order may be obtained according to a quantity of codewords included in a codebook, or obtained according to a quantity of constellation points included in a modulation constellation. The quantity of unit time-frequency resources that are in a transmission area and that can be used to transmit data is obtained by subtracting, from a quantity of all unit time-frequency resources included in the transmission area, a quantity of unit time-frequency resources that are in the transmission area and that are used to send signals (for example, a pilot and HARQ information) other than the data.

Preferably, the second information includes an index of the transport block size determined for each transmission area of the M transmission areas; or the second information includes an index of the coding rate determined for each transmission area of the M transmission areas.

Optionally, in an embodiment, area information of each transmission area includes time domain information and frequency domain information of each transmission area. Preferably, the first information includes a first bit string used to indicate a subframe of each transmission area of the M transmission areas and a second bit string used to indicate a frequency of each transmission area of the M transmission areas.

Optionally, in an embodiment, the method 300 further includes: selecting one constellation-pilot combination from a preset constellation-pilot set for each transmission area of the N transmission areas, where the constellation-pilot set includes multiple constellation-pilot combinations; and generating an uplink pilot signal according to a pilot sequence in the constellation-pilot combination; and the sending, on each transmission area of the N transmission areas, uplink data to the network device according to the transport block size of each transmission area of the N transmission areas includes: generating the uplink data on each transmission area of the N transmission areas according to a modulation constellation in the constellation-pilot combination and according to the transport block size of each transmission area of the N transmission areas; and sending the uplink pilot and the uplink data to the network device on each transmission area of the N transmission areas.

Specifically, in the system in which a constellation is used to perform modulation, for example, a Code Division Multiple Access (CDMA) system, an Orthogonal Frequency Multiple Access (OFDMA) system, a Long Term Evolution (Long Term Evolution, LTE) system, an Orthogonal Frequency Division Multiplexing (OFDM) system, a Generalized Frequency Division Multiplexing (GFDM) system, or a Filtered-Orthogonal Frequency Division Multiplexing (F-OFDM) system, the network device and the terminal device store a constellation-pilot set, so that the terminal device selects a corresponding combination of a constellation and a pilot.

The terminal may select a constellation-pilot combination from a constellation-pilot set (or referred to as a constellation-pilot combination relationship list, for example, the foregoing constellation-pilot combination relationship list that is predefined and stored on the network device and the terminal device) by using a random method, or may select a constellation-pilot combination according to factors such as a data buffer status of the terminal, a channel condition of a transmission area, and a transport block size or a coding rate assigned to a transmission area. For example, when the channel condition is relatively desirable or a large amount of data is buffered or a transport block is relatively large or a coding rate is relatively low, the terminal device selects a constellation-pilot combination corresponding to higher order modulation. When the channel condition is relatively poor or a relatively small amount of data is buffered or a transport block is relatively small or a coding rate is relatively high, the terminal device selects a constellation-pilot combination corresponding to lower order modulation. In addition to the foregoing method, the terminal device may further select a constellation-pilot combination from the constellation-pilot set by using another method, and this is not limited in this embodiment of the present invention. It should be understood in this embodiment of the present invention, uplink data may be a symbol obtained after constellation modulation is performed.

Optionally, in an embodiment, the constellation-pilot combination meets the following condition: a quantity of unit time-frequency resources that are in a transmission area and that can be used to transmit data*a modulation order of a modulation constellation in a constellation-pilot combination>a transport block size determined for the transmission area.

Specifically, regardless of which method is used to select a constellation-pilot combination, if a transport block size is assigned to a transmission area, when the terminal device selects a constellation-pilot combination, it needs to be ensured that a selected constellation-pilot combination meets the following condition: a quantity of unit time-frequency resources that are in a transmission area and that can be used to transmit data*a modulation order>a transport block size assigned to a transmission area. The unit time-frequency resource refers to a minimum time-frequency resource, for example, an RE in an OFDM system, used to transmit one modulation symbol. The modulation order may be obtained according to a quantity of constellation points included in a constellation. The quantity of unit time-frequency resources that are in a transmission area and that can be used to transmit data is obtained by subtracting, from a quantity of all unit time-frequency resources included in the transmission area, a quantity of unit time-frequency resources that are in the transmission area and that are used to send signals (for example, a pilot and HARQ information) other than the data.

Optionally, in an embodiment, the indication message further includes third information, the third information is used to indicate at least one codebook-pilot set that is determined by the network device for each transmission area of the M transmission areas, and the codebook-pilot set includes multiple codebooks, pilot sequences, and a combination relationship between a codebook and a pilot sequence. The method 300 further includes: determining at least one codebook-pilot set of each transmission area of the N transmission areas according to the third information; selecting one codebook-pilot combination from the at least one codebook-pilot set for each transmission area of the N transmission areas; and generating an uplink pilot signal according to a pilot sequence in the codebook-pilot combination. The sending, on each transmission area of the N transmission areas, uplink data to the network device according to the transport block size of each transmission area of the N transmission areas includes: generating the uplink data on each transmission area of the N transmission areas according to a codebook in the codebook-pilot combination and according to the transport block size of each transmission area of the N transmission areas; and sending the uplink pilot and the uplink data to the network device on each transmission area of the N transmission areas.

Optionally, in an embodiment, the codebook is a sparse code multiple access SCMA codebook, that is, the codebook includes two or more codewords, the codeword is a multi-dimensional complex vector and is used to represent a mapping relationship between data and at least two modulation symbols, and the at least two modulation symbols include at least one zero modulation symbol and at least one non-zero modulation symbol.

This embodiment of the present invention is applicable to a system in which a codebook is used to perform modulation, and the system is, for example, an SCMA system or an LDS system. The third information used to indicate a codebook-pilot set may be information that directly indicates a combination of a codebook and a pilot (applicable to the SCMA system), or may be information that indicates a combination of a modulation constellation, a signature sequence, and a pilot, so that a codebook is determined by using the modulation constellation and the signature sequence, so as to further indicate the combination of the codebook and the pilot (applicable to the LDS system). This is not limited in this embodiment of the present invention.

The terminal device may select a codebook-pilot combination from a codebook-pilot set by using a random method, or may select a codebook-pilot combination according to one or more of factors such as a data buffer status of the terminal, a channel condition of a transmission area, and a transport block size or a coding rate assigned to a transmission area. For example, when the channel condition is relatively desirable or a transport block size is relatively large or a coding rate is relatively low, the terminal device selects a codebook-pilot combination corresponding to higher order modulation (a modulation order may be obtained according to a quantity of codewords included in a codebook, for example, the quantity of codewords is $Q_m$, and the corresponding modulation order is $\log_2(Q_m)$). When the channel condition is relatively poor or the transport block size is relatively small or the coding rate is relatively high, the terminal device selects a codebook-pilot combination corresponding to lower order modulation. When a relatively large amount of data is buffered, the terminal device selects a codebook-pilot combination that includes multiple codebooks to send multiple data streams, or selects a codebook-pilot combination corresponding to higher order modulation. When a relatively small amount of data is buffered, the terminal device selects a codebook-pilot combination that includes a single codebook, or selects a codebook-pilot combination corresponding to lower order modulation. In addition to the foregoing method, the terminal device may further select a codebook-pilot combination from a codebook-pilot set by using another method, and this is not limited in this embodiment of the present invention. It should be understood in this embodiment of the present invention, the uplink data may be a symbol that is obtained after SCMA codebook modulation is performed.

Optionally, in an embodiment, the codebook-pilot combination meets the following condition: a quantity of unit time-frequency resources that are in a transmission area and that can be used to transmit data*a modulation order of a codebook in a codebook-pilot combination>a transport block size determined for the transmission area.

Specifically, regardless of which method is used, if a transport block size is assigned to a transmission area, when the terminal device selects a codebook-pilot combination, it must be ensured that the selected codebook-pilot combination meets the following condition: a quantity of unit time-frequency resources that are in a transmission area and that can be used to transmit data*a modulation order/a total quantity of elements in a codeword>a transport block size bound to the transmission area. The unit time-frequency resource refers to a minimum time-frequency resource used to transmit one modulation symbol. The modulation order may be obtained according to a quantity of codewords included in a codebook. The quantity of unit time-frequency resources that are in a transmission area and that can be used to transmit data is obtained by subtracting, from a quantity of all unit time-frequency resources included in the transmission area, a quantity of unit time-frequency resources that are in the transmission area and that are used to send signals (for example, a pilot and HARQ information) other than the data.

Therefore, in the uplink data transmission method provided in this embodiment of the present invention, at least one transmission area is selected, and uplink data is transmitted according to related information about a transport block size assigned to the transmission area. Therefore, a network device can decode uplink data on a transmission area according to a transport block size. In this way, a processing delay can be reduced.

Embodiments of the present invention are described below in detail with reference to FIG. 6 and FIG. 7 by using two specific examples.

Figure 6:
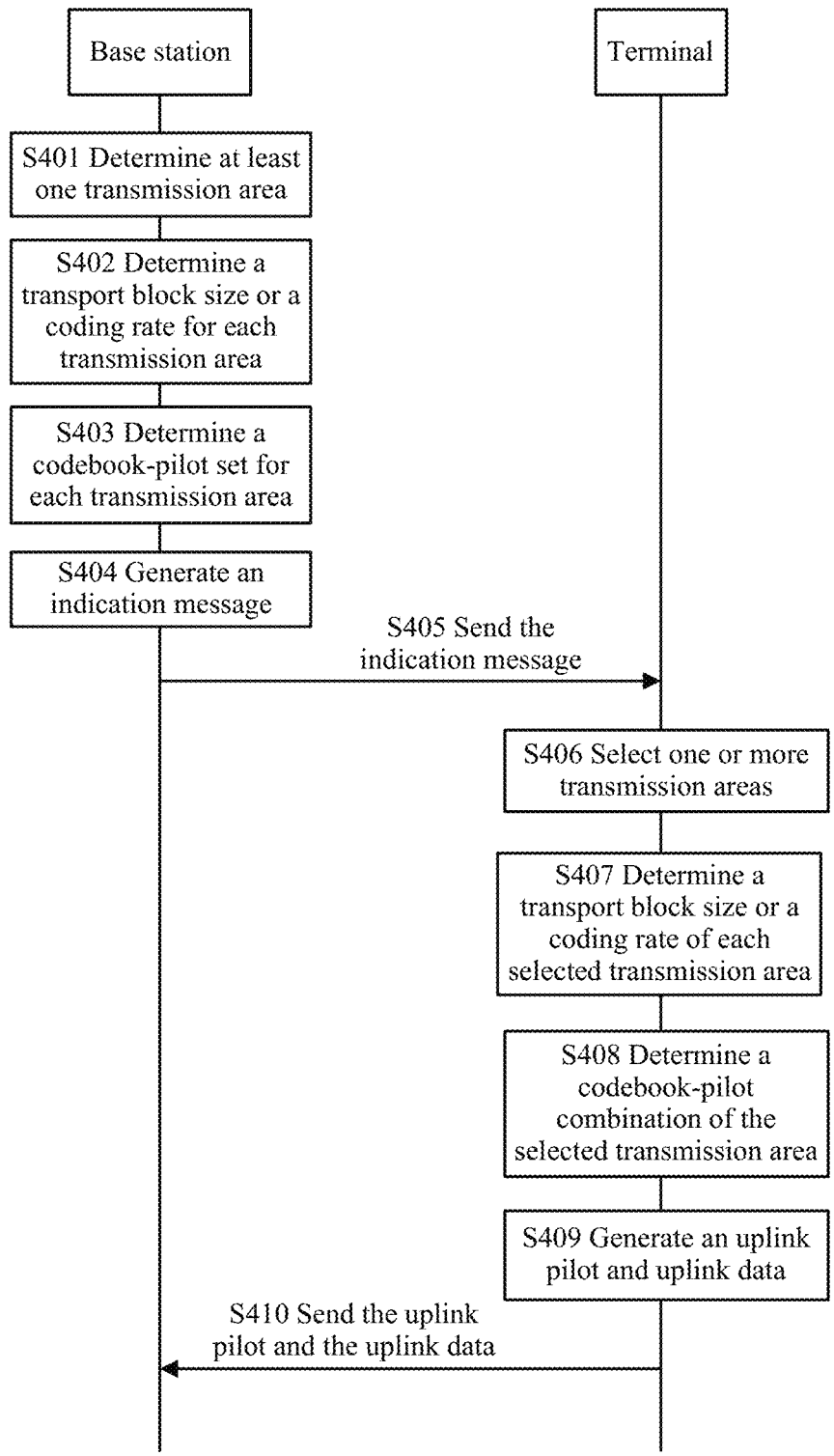
FIG. 6 is a schematic flowchart of an uplink data transmission method according to an embodiment of the present invention.

FIG. 6 is a schematic flowchart of an uplink data transmission method 400 according to an embodiment of the present invention. In this embodiment of the present invention, an example in which a network device is a base station and a terminal device is a terminal is used for description. As shown in FIG. 6, the method 400 includes the following steps.

S401: The base station determines at least one transmission area.

S402: The base station determines, for each transmission area, a transport block size or a coding rate used to calculate a transport block size.

S403: The base station determines a codebook-pilot set for each transmission area.

S404: The base station generates an indication message, where the indication message includes at least one transmission area, the transport block size determined for each transmission area, or the coding rate that is determined for each transmission area and that is used to calculate a transport block size, and the codebook-pilot set of each transmission area.

S405: The base station sends the indication message to the terminal.

S406: The terminal selects one or more transmission areas from the at least one transmission area according to the indication message.

S407: The terminal determines, according to the indication message, a transport block size of each selected transmission area or a coding rate, which is used to calculate a transport block size, of each selected transmission area.

S408: The terminal selects, according to the indication message, a codebook-pilot combination from the codebook-pilot set as a codebook-pilot combination of the selected transmission area.

S409: The terminal generates an uplink pilot and uplink data according to the codebook-pilot combination and the transport block size or the coding rate used to calculate a transport block size.

S410: The terminal sends the uplink pilot and the uplink data to the network device on one or more transmission areas.

Therefore, in the uplink data transmission method provided in this embodiment of the present invention, a network device determines at least one transmission area, and related information about a transport block size is assigned to the transmission area, so that a terminal device transmits uplink data on the transmission area by using the corresponding transport block size. Therefore, a network device can decode uplink data on a transmission area according to a transport block size. In this way, a processing delay can be reduced.

Figure 7:
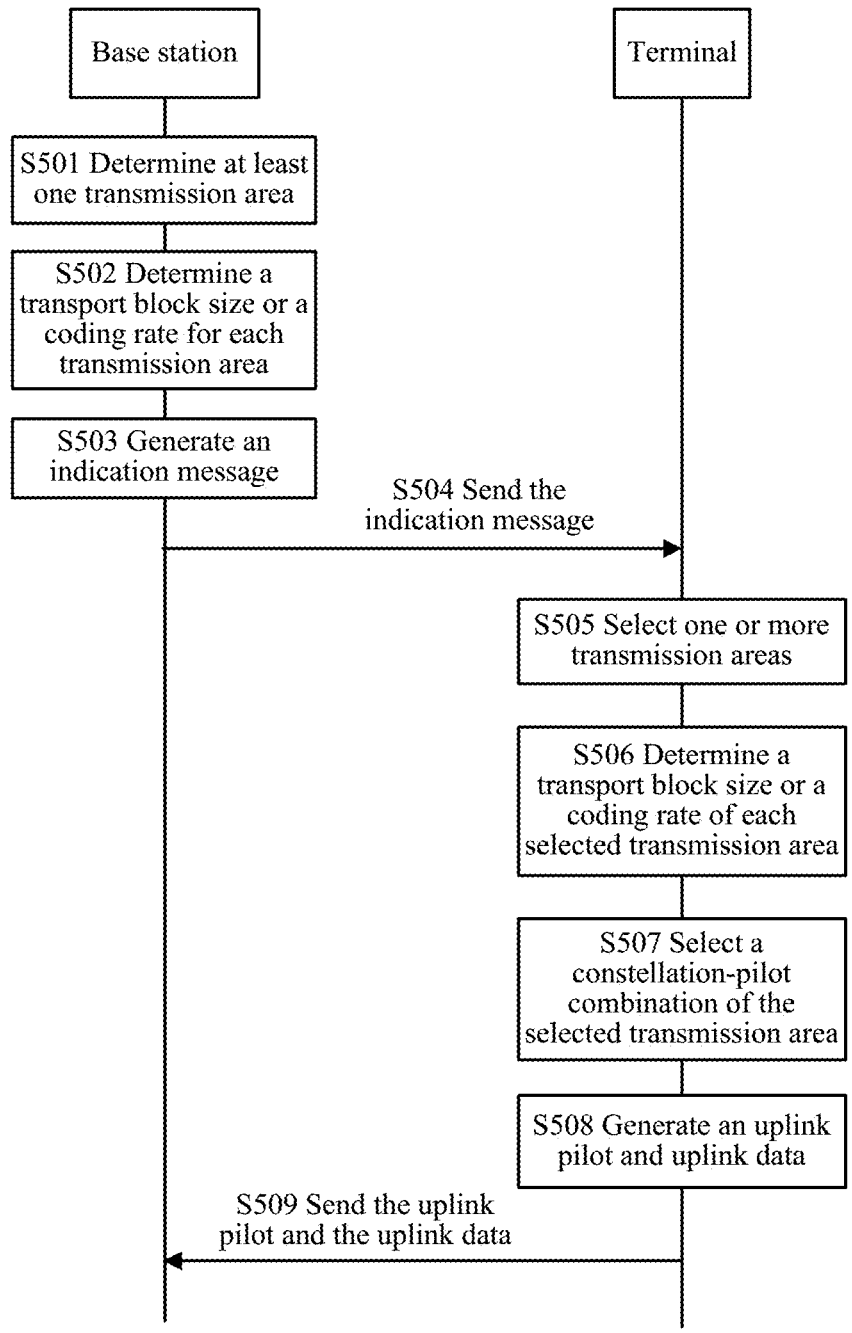
FIG. 7 is a schematic flowchart of an uplink data transmission method according to an embodiment of the present invention.

FIG. 7 is a schematic flowchart of an uplink data transmission method 500 according to an embodiment of the present invention. In this embodiment of the present invention, an example in which a network device is a base station and a terminal device is a terminal is used for description. As shown in FIG. 7, the method 500 includes:

S501: The base station determines at least one transmission area.

S502: The base station determines, for each transmission area, a transport block size or a coding rate used to calculate a transport block size.

S503: The base station generates an indication message, where the indication message includes at least one transmission area, the transport block size determined for each transmission area, or the coding rate that is determined for each transmission area and that is used to calculate a transport block size.

S504: The base station sends the indication message to the terminal.

S505: The terminal selects one or more transmission areas from the at least one transmission area according to the indication message.

S506: The terminal determines, according to the indication message, a transport block size of each selected transmission area or a coding rate, which is used to calculate a transport block size, of each selected transmission area.

S507: The terminal selects a constellation-pilot combination as a constellation-pilot combination of the selected transmission area according to a constellation-pilot set stored on the terminal.

S508: The terminal generates an uplink pilot and uplink data according to the constellation-pilot combination and the transport block size or the coding rate used to calculate a transport block size.

S509: The terminal sends the uplink pilot and the uplink data to the network device on the one or more transmission areas.

Therefore, in the uplink data transmission method provided in this embodiment of the present invention, a network device determines at least one transmission area, and related information about a transport block size is assigned to the transmission area, so that a terminal device transmits uplink data on the transmission area by using the corresponding transport block size. Therefore, a network device can decode uplink data on a transmission area according to a transport block size. In this way, a processing delay can be reduced.

The uplink data transmission methods according to the embodiments of the present invention are described above in detail with reference to FIG. 2 to FIG. 7. Uplink data transmission apparatuses according to embodiments of the present invention are described below with reference to FIG. 8 to FIG. 11.

Figure 8:
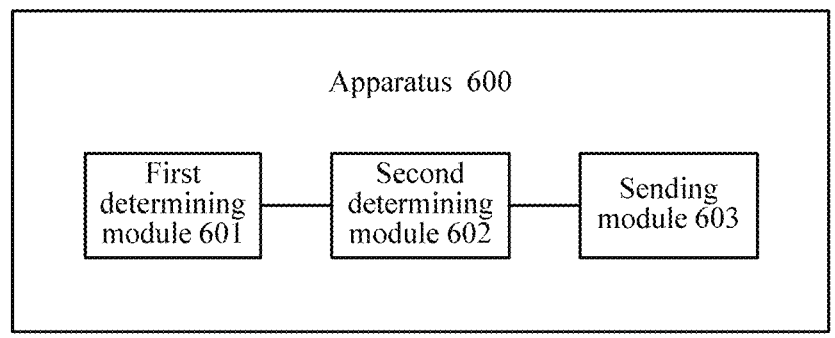
FIG. 8 is a schematic block diagram of an uplink data transmission apparatus according to an embodiment of the present invention.

FIG. 8 shows an uplink data transmission apparatus 600 according to an embodiment of the present invention. As shown in FIG. 8, the apparatus 600 includes: a first determining module 601, configured to: determine M transmission areas allocated to a terminal device, and generate first information used to indicate the M transmission areas, where M is a positive integer, and the transmission area represents an air interface time-frequency resource that includes a time range and a frequency range that are specified by a communications system; a second determining module 602, configured to determine, for each transmission area of the M transmission areas that are determined by the first determining module 601, second information used to indicate a transport block size; and a sending module 603, configured to send an indication message to the terminal device, so that the terminal device transmits uplink data according to the indication message, where the indication message includes the first information determined by the first determining module 601 and the second information determined by the second determining module 602.

Therefore, the uplink data transmission apparatus provided in this embodiment of the present invention determines at least one transmission area, and assigns related information about a transport block size to the transmission area, so that a terminal device transmits uplink data on the transmission area by using the corresponding transport block size. Therefore, uplink data can be decoded on a transmission area according to a transport block size. In this way, a processing delay can be reduced.

Optionally, in an embodiment, the apparatus 600 further includes: a second determining module, configured to: determine at least one codebook-pilot set for each transmission area of the M transmission areas that are determined by the first determining module 601, and generate third information used to indicate the at least one codebook-pilot set, where the indication message sent by the sending module 603 further includes the third information, where the codebook-pilot set includes multiple codebooks, multiple pilot sequences, and a combination relationship between a codebook and a pilot sequence.

Optionally, in an embodiment, the codebook includes two or more codewords, the codeword is a multidimensional complex vector and is used to represent a mapping relationship between data and at least two modulation symbols, and the at least two modulation symbols include at least one zero modulation symbol and at least one non-zero modulation symbol.

Optionally, in an embodiment, the second information includes information about a transport block size determined for each transmission area of the M transmission areas; or the second information includes information about a coding rate determined for each transmission area of the M transmission areas, so that the terminal device determines a transport block size according to a quantity of unit time-frequency resources that are in a transmission area and that can be used to transmit data, a modulation order, and the coding rate.

transmission areas according to transport block sizes of the N transmission areas, where N is a positive integer less than or equal to M; and a decoding module, configured to decode the uplink data on the N transmission areas according to the transport block sizes of the N transmission areas.

Optionally, in an embodiment, the first information includes time domain information and frequency domain information of each transmission area of the M transmission areas.

Optionally, in an embodiment, the third information includes an index of the at least one codebook-pilot set.

Optionally, in an embodiment, the second information includes an index of the transport block size determined for each transmission area of the M transmission areas; or the second information includes an index of the coding rate determined for each transmission area of the M transmission areas.

Optionally, in an embodiment, the first information includes a first bit string used to indicate a subframe of a time domain of each transmission area of the M transmission areas and a second bit string used to indicate a resource block of a frequency domain of each transmission area of the M transmission areas.

Optionally, in an embodiment, the sending module 603 is specifically configured to: carry the indication message on a broadcast channel, and send, in a broadcast manner, the indication message to all or some of terminal devices served by a network device; or carry the indication message on a dedicated control channel, and send, in a unicast manner, the indication message to one specific terminal device or one specific group of terminal devices served by the network device.

Optionally, in an embodiment, the apparatus 600 is a network device.

It should be understood that the apparatus 600 according to this embodiment of the present invention may correspond to the network device in the method embodiment of the present invention, and the foregoing and other operations and/or functions of the modules in the apparatus 600 are separately used to implement corresponding procedures in the methods in FIG. 2 to FIG. 7, and are no longer described herein in detail for brevity.

Therefore, the uplink data transmission apparatus provided in this embodiment of the present invention determines at least one transmission area, and assigns related information about a transport block size to the transmission area, so that a terminal device transmits uplink data on the transmission area by using the corresponding transport block size. Therefore, uplink data can be decoded on a transmission area according to a transport block size. In this way, a processing delay can be reduced.

Figure 9:
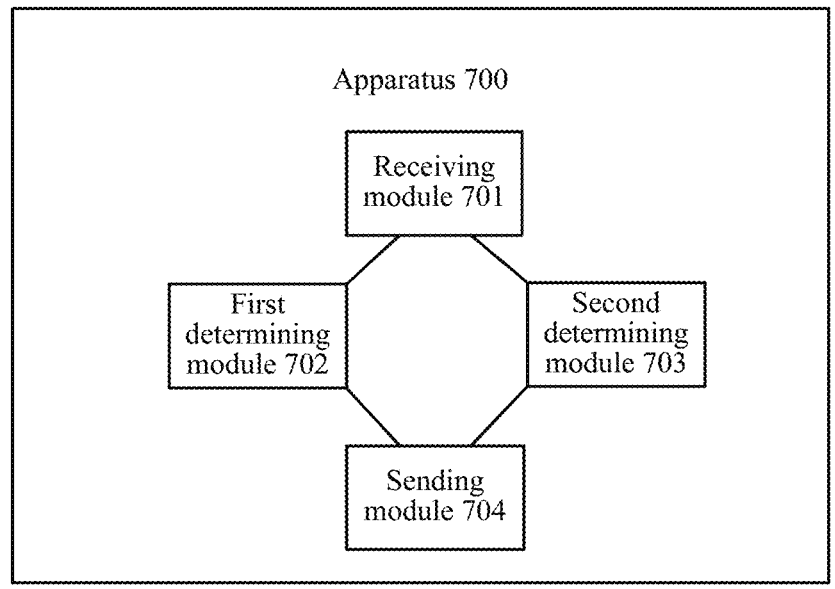
FIG. 9 is a schematic block diagram of an uplink data transmission apparatus according to an embodiment of the present invention.

FIG. 9 shows an uplink data transmission apparatus 700 according to an embodiment of the present invention. As shown in FIG. 9, the apparatus 700 includes: a receiving module 701, configured to receive an indication message sent by a network device, where the indication message includes first information and second information, the first information is used to indicate M transmission areas allocated by the network device, the second information is used to indicate a transport block size of each transmission area of the M transmission areas, M is a positive integer, and the transmission area represents an air interface time-frequency resource that includes a time range and a frequency range that are specified by a communications system; a first determining module 702, configured to select N transmission areas from the M transmission areas according to the first information, where N is a positive integer less than or equal to M; a second determining module 703, configured to determine, according to the second information, a transport block size of each transmission area of the N transmission areas determined by the first determining module; and a sending module 704, configured to send, on each transmission area of the N transmission areas determined by the first determining module 702, uplink data to the network device according to the transport block size, which is determined by the second determining module 703, of each transmission area of the N transmission areas.

Therefore, the uplink data transmission apparatus provided in this embodiment of the present invention selects at least one transmission area, and transmits uplink data according to related information, which is assigned to the transmission area, about a transport block size. Therefore, a network device can decode uplink data on a transmission area according to a transport block size. In this way, a processing delay can be reduced.

Optionally, in an embodiment, the apparatus 700 further includes: a third determining module, configured to select one constellation-pilot combination from a preset constellation-pilot set for each transmission area of the N transmission areas, where the constellation-pilot set includes multiple constellation-pilot combinations; and a first generation module, configured to generate an uplink pilot signal according to a pilot sequence in the constellation-pilot combination determined by the third determining module. The sending module 704 is specifically configured to: generate uplink data on each transmission area of the N transmission areas according to a modulation constellation in the constellation-pilot combination and according to the transport block size of each transmission area of the N transmission areas; and send the uplink pilot and the uplink data to the network device on each transmission area of the N transmission areas.

Optionally, in an embodiment, the indication message further includes third information, the third information is used to indicate at least one codebook-pilot set that is determined by the network device for each transmission area of the M transmission areas, and the codebook-pilot set includes multiple codebooks, pilot sequences, and a combination relationship between a codebook and a pilot sequence. The apparatus 700 further includes: a fourth determining module, configured to determine at least one codebook-pilot set of each transmission area of the N transmission areas according to the third information; a fifth determining module, configured to select one codebook-pilot combination from the at least one codebook-pilot set for each transmission area of the N transmission areas; and a second generation module, configured to generate an uplink pilot signal according to a pilot sequence in the codebook-pilot combination. The sending module 704 is specifically configured to: generate uplink data on each transmission area of the N transmission areas according to a codebook in the codebook-pilot combination and according to the transport block size of each transmission area of the N transmission areas; and send the uplink pilot and the uplink data to the network device on each transmission area of the N transmission areas.

Optionally, in an embodiment, the codebook is a sparse code multiple access SCMA codebook, the codebook includes two or more codewords, the codeword is a multi-dimensional complex vector and is used to represent a mapping relationship between data and at least two modulation symbols, and the at least two modulation symbols include at least one zero modulation symbol and at least one non-zero modulation symbol.

Optionally, in an embodiment, the constellation-pilot combination meets the following condition: a quantity of unit time-frequency resources that are in a transmission area and that can be used to transmit data*a modulation order of a modulation constellation in a constellation-pilot combination>a transport block size determined for the transmission area.

Optionally, in an embodiment, the codebook-pilot combination meets the following condition: a quantity of unit time-frequency resources that are in a transmission area and that can be used to transmit data*a modulation order of a codebook in a codebook-pilot combination>a transport block size determined for the transmission area.

Optionally, in an embodiment, the second information includes information about a transport block size that is determined by the network device for each transmission area of the M transmission areas; or the second information includes information about a coding rate that is determined by the network device for each transmission area of the M transmission areas, and the second determining module is specifically configured to: determine the transport block size of each transmission area of the N transmission areas according to a quantity of unit time-frequency resources that are in each transmission area of the N transmission areas and that can be used to transmit data, a modulation order, and the coding rate.

Optionally, in an embodiment, the first information includes time domain information and frequency domain information of each transmission area of the M transmission areas.

Optionally, in an embodiment, the third information includes an index of the at least one codebook-pilot set.

Optionally, in an embodiment, the second information includes an index of the transport block size determined for each transmission area of the M transmission areas; or the second information includes an index of the coding rate determined for each transmission area of the M transmission areas.

Optionally, in an embodiment, the first information includes a first bit string used to indicate a subframe of a time domain of each transmission area of the M transmission areas and a second bit string used to indicate a resource block of a frequency domain of each transmission area of the M transmission areas.

Optionally, in an embodiment, the apparatus 700 is a terminal device.

It should be understood that the apparatus 700 according to this embodiment of the present invention may correspond to the network device in the method embodiment of the present invention, and the foregoing and other operations and/or functions of the modules in the apparatus 700 are separately used to implement corresponding procedures in the methods in FIG. 2 to FIG. 7, and are no longer described herein in detail for brevity.

Therefore, the uplink data transmission apparatus provided in this embodiment of the present invention selects at least one transmission area, and transmits uplink data according to related information, which is assigned to the transmission area, about a transport block size. Therefore, a network device can decode uplink data on a transmission area according to a transport block size. In this way, a processing delay can be reduced.

Figure 10:
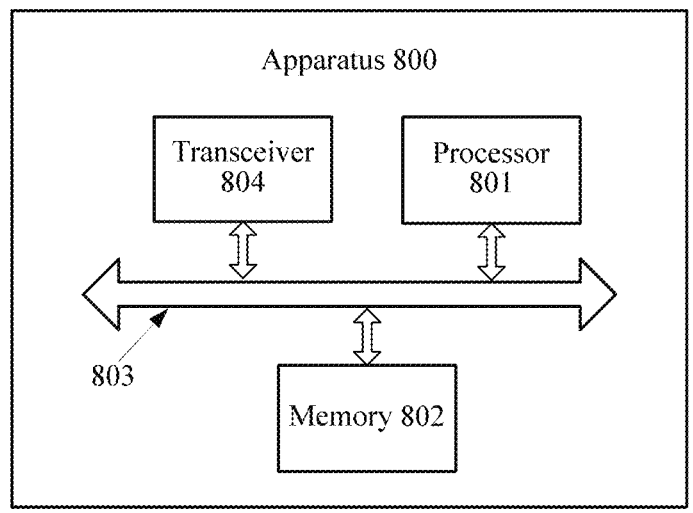
FIG. 10 is a schematic block diagram of an uplink data transmission apparatus according to an embodiment of the present invention.

As shown in FIG. 10, an embodiment of the present invention further provides an uplink data transmission apparatus 800. The apparatus 800 includes: a processor 801, a memory 802, a bus system 803, and a transceiver 804. The processor 801, the memory 802, and the transceiver 804 are connected by using the bus system 803. The memory 802 is configured to store an instruction, and the processor 801 is configured to execute the instruction stored in the memory 802, so as to control the transceiver 804 to send a signal. The processor 801 is configured to: determine M transmission areas allocated to a terminal device, and generate first information used to indicate the M transmission areas, where M is a positive integer, and the transmission area represents an air interface time-frequency resource that includes a time range and a frequency range that are specified by a communications system; and determine, for each transmission area of the M transmission areas, second information used to indicate a transport block size. The transceiver 804 is configured to send an indication message to the terminal device, so that the terminal device transmits uplink data according to the indication message, where the indication message includes the first information and the second information.

Therefore, the uplink data transmission apparatus provided in this embodiment of the present invention determines at least one transmission area, and assigns related information about a transport block size to the transmission area, so that a terminal device transmits uplink data on the transmission area by using the corresponding transport block size. Therefore, uplink data can be decoded on a transmission area according to a transport block size. In this way, a processing delay can be reduced.

It should be understood that in this embodiment of the present invention, the processor 801 may be a central processing unit ("CPU" for short), or the processor 801 may be another general purpose processor, a digital signal processor (DSP), an application-specific integrated circuit (ASIC), a field programmable gate array (FPGA), or another programmable logical device, discrete gate or transistor logical device, discrete hardware component, or the like. The general purpose processor may be a microprocessor or the processor may be any conventional processor or the like.

The memory 802 may include a read-only memory and a random access memory, and provides an instruction and data to the processor 801. A part of the memory 802 may further include a non-volatile random access memory. For example, the memory 802 may further store device-type information.

The bus system 803 may include a power bus, a control bus, a status signal bus, and the like in addition to a data bus. However, for the purpose of clear description, various types of buses in the figure are all marked as the bus system 803.

In an implementation process, the steps of the foregoing methods may be completed by using an integrated logical circuit of hardware in the processor 801 or an instruction in a form of software. Steps of the methods disclosed with reference to the embodiments of the present invention may be directly performed and completed by means of a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 802, and the processor 801 reads information in the memory 802 and completes the steps of the foregoing methods in combination with hardware of the processor 910. To avoid repetition, details are not described herein again.

Optionally, in an embodiment, the processor 801 is further configured to: determine at least one codebook-pilot set for each transmission area of the M transmission areas, and generate third information used to indicate the at least one codebook-pilot set, where the codebook-pilot set includes multiple codebooks, multiple pilot sequences, and a combination relationship between a codebook and a pilot sequence, and the indication message sent by the transceiver 804 further includes the third information.

Optionally, in an embodiment, the codebook is a sparse code multiple access SCMA codebook, the codebook includes two or more codewords, the codeword is a multidimensional complex vector and is used to represent a mapping relationship between data and at least two modulation symbols, and the at least two modulation symbols include at least one zero modulation symbol and at least one non-zero modulation symbol.

Optionally, in an embodiment, the second information includes information about a transport block size determined for each transmission area of the M transmission areas; or the second information includes information about a coding rate determined for each transmission area of the M transmission areas, so that the terminal device determines a transport block size according to a quantity of unit time-frequency resources that are in a transmission area and that can be used to transmit data, a modulation order, and the coding rate.

Optionally, in an embodiment, the transceiver 804 is further configured to: receive uplink data that is sent by the terminal device on N transmission areas according to transport block sizes of the N transmission areas, where N is a positive integer less than or equal to M. The processor 801 is further configured to: decode the uplink data on the N transmission areas according to the transport block sizes of the N transmission areas.

Optionally, in an embodiment, the first information includes time domain information and frequency domain information of each transmission area of the M transmission areas.

Optionally, in an embodiment, the sending, by the transceiver 804, an indication message to the terminal device includes: carrying the indication message on a broadcast channel, and sending, in a broadcast manner, the indication message to all or some of terminal devices served by a network device; or carrying the indication message on a dedicated control channel, and sending, in a unicast manner, the indication message to one specific terminal device or one specific group of terminal devices served by the network device.

Optionally, in an embodiment, the third information includes an index of the at least one codebook-pilot set.

Optionally, in an embodiment, the second information includes an index of the transport block size determined for each transmission area of the M transmission areas; or the second information includes an index of the coding rate determined for each transmission area of the M transmission areas.

Optionally, in an embodiment, the first information includes a first bit string used to indicate a subframe of a time domain of each transmission area of the M transmission areas and a second bit string used to indicate a resource block of a frequency domain of each transmission area of the M transmission areas.

Optionally, in an embodiment, the apparatus 800 is a terminal device.

It should be understood that the uplink data transmission apparatus 800 according to this embodiment of the present invention may correspond to the network device and the apparatus 600 in this embodiment of the present invention, and may correspond to a corresponding object that performs the methods according to the embodiments of the present invention. The foregoing and other operations and/or functions of the modules in the apparatus 800 are separately used to implement corresponding procedures in the methods in FIG. 2 to FIG. 7, and are no longer described herein in detail for brevity.

Therefore, the uplink data transmission apparatus provided in this embodiment of the present invention determines at least one transmission area, and assigns related information about a transport block size to the transmission area, so that a terminal device transmits uplink data on the transmission area by using the corresponding transport block size. Therefore, uplink data can be decoded on a transmission area according to a transport block size. In this way, a processing delay can be reduced.

Figure 11:
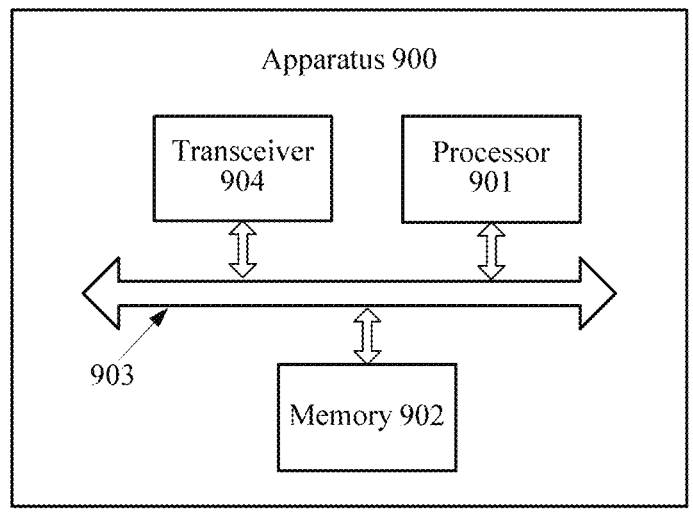
FIG. 11 is a schematic block diagram of an uplink data transmission apparatus according to an embodiment of the present invention.

As shown in FIG. 11, an embodiment of the present invention further provides an uplink data transmission apparatus 900. The apparatus 900 includes: a processor 901, a memory 902, a bus system 903, and a transceiver 904. The processor 901, the memory 902, and the transceiver 904 are connected by using the bus system 903. The memory 902 is configured to store an instruction, and the processor 901 is configured to execute the instruction stored in the memory 902, so as to control the transceiver 904 to send a signal. The transceiver 904 is configured to: receive an indication message sent by a network device, where the indication message includes first information and second information, the first information is used to indicate M transmission areas allocated by the network device, the second information is used to indicate a transport block size of each transmission area of the M transmission areas, M is a positive integer, and the transmission area represents an air interface time-frequency resource that includes a time range and a frequency range that are specified by a communications system; the processor 901 is configured to: select N transmission areas from the M transmission areas according to the first information, where N is a positive integer less than or equal to M; and determine a transport block size of each transmission area of the N transmission areas according to the second information. The transceiver 904 is further configured to: send, on each transmission area of the N transmission areas, uplink data to the network device according to the transport block size of each transmission area of the N transmission areas.

Therefore, the uplink data transmission apparatus provided in this embodiment of the present invention selects at least one transmission area, and transmits uplink data according to related information, which is assigned to the transmission area, about a transport block size. Therefore, a network device can decode uplink data on a transmission area according to a transport block size. In this way, a processing delay can be reduced.

It should be understood that in this embodiment of the present invention, the processor 901 may be a central processing unit ("CPU" for short), or the processor 901 may be another general purpose processor, a digital signal processor (DSP), an application-specific integrated circuit (ASIC), a field programmable gate array (FPGA), or another programmable logical device, discrete gate or transistor logical device, discrete hardware component, or the like. The general purpose processor may be a microprocessor or the processor may be any conventional processor or the like.

The memory 902 may include a read-only memory and a random access memory, and provides an instruction and data to the processor 901. A part of the memory 902 may further include a non-volatile random access memory. For example, the memory 902 may further store device-type information.

The bus system 903 may include a power bus, a control bus, a status signal bus, and the like in addition to a data bus. However, for the purpose of clear description, various types of buses in the figure are all marked as the bus system 903.

In an implementation process, the steps of the foregoing methods may be completed by using an integrated logical circuit of hardware in the processor 901 or an instruction in a form of software. Steps of the methods disclosed with reference to the embodiments of the present invention may be directly performed and completed by means of a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 902, and the processor 901 reads information in the memory 902 and completes the steps of the foregoing methods in combination with hardware of the processor 901. To avoid repetition, details are not described herein again.

Optionally, in an embodiment, the processor 901 is further configured to: select one constellation-pilot combination from a preset constellation-pilot set for each transmission area of the N transmission areas, where the constellation-pilot set includes multiple constellation-pilot combinations; and generate an uplink pilot signal according to a pilot sequence in the constellation-pilot combination. The sending, by the transceiver 904 on each transmission area of the N transmission areas, uplink data to the network device according to the transport block size of each transmission area of the N transmission areas includes: generating the uplink data on each transmission area of the N transmission areas according to a modulation constellation in the constellation-pilot combination and according to the transport block size of each transmission area of the N transmission areas; and sending the uplink pilot and the uplink data to the network device on each transmission area of the N transmission areas.

Optionally, in an embodiment, the indication message further includes third information, the third information is used to indicate at least one codebook-pilot set that is determined by the network device for each transmission area of the M transmission areas, and the codebook-pilot set includes multiple codebooks, pilot sequences, and a combination relationship between a codebook and a pilot sequence.

The processor 901 is further configured to: determine at least one codebook-pilot set of each transmission area of the N transmission areas according to the third information; select one codebook-pilot combination from the at least one codebook-pilot set for each transmission area of the N transmission areas; and generate an uplink pilot signal according to a pilot sequence in the codebook-pilot combination. The sending, by the transceiver 904 on each transmission area of the N transmission areas, uplink data to the network device according to the transport block size of each transmission area of the N transmission areas includes: generating the uplink data on each transmission area of the N transmission areas according to a codebook in the codebook-pilot combination and according to the transport block size of each transmission area of the N transmission areas; and sending the uplink pilot and the uplink data to the network device on each transmission area of the N transmission areas.

Optionally, in an embodiment, the codebook is a sparse code multiple access SCMA codebook, the codebook includes two or more codewords, the codeword is a multi-dimensional complex vector and is used to represent a mapping relationship between data and at least two modulation symbols, and the at least two modulation symbols include at least one zero modulation symbol and at least one non-zero modulation symbol.

Optionally, in an embodiment, the constellation-pilot combination meets the following condition: a quantity of unit time-frequency resources that are in a transmission area and that can be used to transmit data*a modulation order of a modulation constellation in a constellation-pilot combination>a transport block size determined for the transmission area.

Optionally, in an embodiment, the codebook-pilot combination meets the following condition: a quantity of unit time-frequency resources that are in a transmission area and that can be used to transmit data*a modulation order of a codebook in a codebook-pilot combination>a transport block size determined for the transmission area.

Optionally, in an embodiment, the second information includes information about a transport block size that is determined by the network device for each transmission area of the M transmission areas; or the second information includes information about a coding rate that is determined by the network device for each transmission area of the M transmission areas, and the determining, by the processor 901, a transport block size of each transmission area of the N transmission areas according to the second information includes: determining the transport block size of each transmission area of the N transmission areas according to a quantity of unit time-frequency resources that are in each transmission area of the N transmission areas and that can be used to transmit data, a modulation order, and the coding rate.

Optionally, in an embodiment, the first information includes time domain information and frequency domain information of each transmission area of the M transmission areas.

Optionally, in an embodiment, the third information includes an index of the at least one codebook-pilot set.

Optionally, in an embodiment, the second information includes an index of the transport block size determined for each transmission area of the M transmission areas; or the second information includes an index of the coding rate determined for each transmission area of the M transmission areas.

Optionally, in an embodiment, the apparatus 900 is a terminal device.

It should be understood that the uplink data transmission apparatus 900 according to this embodiment of the present invention may correspond to the network device and the apparatus 700 in this embodiment of the present invention, and may correspond to a corresponding object that performs the methods according to the embodiments of the present invention. The foregoing and other operations and/or functions of the modules in the apparatus 900 are separately used to implement corresponding procedures in the methods in FIG. 2 to FIG. 7, and are no longer described herein in detail for brevity.

Therefore, the uplink data transmission apparatus provided in this embodiment of the present invention selects at least one transmission area, and transmits uplink data according to related information, which is assigned to the transmission area, about a transport block size. Therefore, a network device can decode uplink data on a transmission area according to a transport block size. In this way, a processing delay can be reduced. In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally represents an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located at one location, or may be distributed on a plurality of network units. A part or all of the units may be selected according to actual needs to achieve the objectives of the solutions of the embodiments of the present invention.

It may be understood that, for the brevity and clarity of the application document, technical features and description in an embodiment in the foregoing are applicable to other embodiments, and are no longer described in detail one by one in the other embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

It may be understood that, for the brevity and clarity of the application document, technical features and description in an embodiment in the foregoing are applicable to other embodiments, for example, technical features in a method embodiment may be applicable to an apparatus embodiment or another method embodiment, and are no longer described in detail one by one in the other embodiments.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

The Present application provides further embodiments as follows.

Embodiment 1

An uplink data transmission method, comprising: determining M transmission areas allocated to a terminal device, and generating first information used to indicate the M transmission areas, wherein M is a positive integer, and the transmission area represents an air interface time-frequency resource that comprises a time range and a frequency range that are specified by a communications system; determining, for each transmission area of the M transmission areas, second information used to indicate a transport block size; and sending an indication message to the terminal device, so that the terminal device transmits uplink data according to the indication message, wherein the indication message comprises the first information and the second information.

Embodiment 2

The method according to embodiment 1, wherein the method further comprises: determining at least one codebook-pilot set for each transmission area of the M transmission areas, and generating third information used to indicate the at least one codebook-pilot set, wherein the indication message further comprises the third information, and the codebook-pilot set comprises multiple codebooks, multiple pilot sequences, and a combination relationship between a codebook and a pilot sequence.

Embodiment 3

The method according to embodiment 2, wherein the codebook comprises two or more codewords, the codeword is a multidimensional complex vector and is used to represent a mapping relationship between data and at least two modulation symbols, and the at least two modulation symbols comprise at least one zero modulation symbol and at least one non-zero modulation symbol.

Embodiment 4

The method according to any one of embodiments 1 to 3, wherein the third information comprises an index of the at least one codebook-pilot set.

Embodiment 5

The method according to any one of embodiments 1 to 4, wherein the second information comprises information about a transport block size determined for each transmission area of the M transmission areas; or the second information comprises information about a coding rate determined for each transmission area of the M transmission areas.

Embodiment 6

The method according to any one of embodiments 1 to 5, wherein the second information comprises an index of the transport block size determined for each transmission area of the M transmission areas; or the second information comprises an index of the coding rate determined for each transmission area of the M transmission areas.

Embodiment 7

The method according to any one of embodiments 1 to 6, wherein the method further comprises: receiving uplink data that is sent by the terminal device on N transmission areas according to transport block sizes of the N transmission areas, wherein N is a positive integer less than or equal to M; and decoding the uplink data on the N transmission areas according to the transport block sizes of the N transmission areas.

Embodiment 8

The method according to any one of embodiments 1 to 7, wherein the first information comprises time domain information and frequency domain information of each transmission area of the M transmission areas.

Embodiment 9

The method according to any one of embodiments 1 to 8, wherein the first information comprises a first bit string used to indicate a subframe of a time domain of each transmission area of the M transmission areas and a second bit string used to indicate a resource block of a frequency domain of each transmission area of the M transmission areas.

Embodiment 10

The method according to any one of embodiments 1 to 9, wherein the sending an indication message to the terminal device comprises: carrying the indication message on a broadcast channel, and sending, in a broadcast manner, the indication message to all or some of terminal devices served by a network device; or carrying the indication message on a dedicated control channel, and sending, in a unicast manner, the indication message to one specific terminal device or one specific group of terminal devices served by the network device.

Embodiment 11

An uplink data transmission method, comprising: receiving an indication message sent by a network device, wherein the indication message comprises first information and second information, the first information is used to indicate M transmission areas allocated by the network device, the second information is used to indicate a transport block size of each transmission area of the M transmission areas, M is a positive integer, and the transmission area represents an air interface time-frequency resource that comprises a time range and a frequency range that are specified by a communications system; selecting N transmission areas from the M transmission areas according to the first information, wherein N is a positive integer less than or equal to M; determining a transport block size of each transmission area of the N transmission areas according to the second information; and sending, on each transmission area of the N transmission areas, uplink data to the network device according to the transport block size of each transmission area of the N transmission areas.

Embodiment 12

The method according to embodiment 11, wherein the method further comprises: selecting one constellation-pilot combination from a preset constellation-pilot set for each transmission area of the N transmission areas, wherein the constellation-pilot set comprises multiple constellation-pilot combinations; and generating an uplink pilot signal according to a pilot sequence in the constellation-pilot combination. The sending, on each transmission area of the N transmission areas, uplink data to the network device according to the transport block size of each transmission area of the N transmission areas comprises: generating the uplink data on each transmission area of the N transmission areas according to a modulation constellation in the constellation-pilot combination and according to the transport block size of each transmission area of the N transmission areas; and sending the uplink pilot and the uplink data to the network device on each transmission area of the N transmission areas.

Embodiment 13

The method according to embodiment 11, wherein the indication message further comprises third information, the third information is used to indicate at least one codebook-pilot set that is determined by the network device for each transmission area of the M transmission areas, and the codebook-pilot set comprises multiple codebooks, pilot sequences, and a combination relationship between a codebook and a pilot sequence. The method further comprises: determining at least one codebook-pilot set of each transmission area of the N transmission areas according to the third information; selecting one codebook-pilot combination from the at least one codebook-pilot set for each transmission area of the N transmission areas; and generating an uplink pilot signal according to a pilot sequence in the codebook-pilot combination. The sending, on each transmission area of the N transmission areas, uplink data to the network device according to the transport block size of each transmission area of the N transmission areas comprises: generating the uplink data on each transmission area of the N transmission areas according to a codebook in the codebook-pilot combination and according to the transport block size of each transmission area of the N transmission areas; and sending the uplink pilot and the uplink data to the network device on each transmission area of the N transmission areas.

Embodiment 14

The method according to embodiment 13, wherein the codebook comprises two or more codewords, the codeword is a multidimensional complex vector and is used to represent a mapping relationship between data and at least two modulation symbols, and the at least two modulation symbols comprise at least one zero modulation symbol and at least one non-zero modulation symbol.

Embodiment 15

The method according to embodiment 13 or 14, wherein the third information comprises an index of the at least one codebook-pilot set.

Embodiment 16

The method according to embodiment 12, wherein the constellation-pilot combination meets the following condition: a quantity of unit time-frequency resources that are in a transmission area and that can be used to transmit data*a modulation order of a modulation constellation in a constellation-pilot combination>a transport block size determined for the transmission area.

Embodiment 17

The method according to any one of embodiments 13 to 15, wherein the codebook-pilot combination meets the following condition: a quantity of unit time-frequency resources that are in a transmission area and that can be used to transmit data*a modulation order of a codebook in a codebook-pilot combination>a transport block size determined for the transmission area.

Embodiment 18

The method according to any one of embodiments 11 to 17, wherein the second information comprises information about a coding rate that is determined by the network device for each transmission area of the M transmission areas, and the determining a transport block size of each transmission area of the N transmission areas according to the second information comprises: determining the transport block size of each transmission area of the N transmission areas according to a quantity of unit time-frequency resources that are in each transmission area of the N transmission areas and that can be used to transmit data, a modulation order, and the coding rate.

Embodiment 19

The method according to any one of embodiments 11 to 17, wherein the second information comprises an index of the transport block size determined for each transmission area of the M transmission areas; or the second information comprises an index of a coding rate determined for each transmission area of the M transmission areas.

Embodiment 20

The method according to any one of embodiments 11 to 19, wherein the first information comprises time domain information and frequency domain information of each transmission area of the M transmission areas.

Embodiment 21

The method according to any one of embodiments 11 to 20, wherein the first information comprises a first bit string used to indicate a subframe of a time domain of each transmission area of the M transmission areas and a second bit string used to indicate a resource block of a frequency domain of each transmission area of the M transmission areas.

Embodiment 22

An uplink data transmission apparatus, comprising: a first determining module, configured to: determine M transmission areas allocated to a terminal device, and generate first information used to indicate the M transmission areas, wherein M is a positive integer, and the transmission area represents an air interface time-frequency resource that comprises a time range and a frequency range that are specified by a communications system; a second determining module, configured to determine, for each transmission area of the M transmission areas that are determined by the first determining module, second information used to indicate a transport block size; and a sending module, configured to send an indication message to the terminal device, so that the terminal device transmits uplink data according to the indication message, wherein the indication message comprises the first information determined by the first determining module and the second information determined by the second determining module.

Embodiment 23

The apparatus according to embodiment 22, wherein the apparatus further comprises: a second determining module, configured to: determine at least one codebook-pilot set for each transmission area of the M transmission areas that are determined by the first determining module, and generate third information used to indicate the at least one codebook-pilot set, wherein the indication message sent by the sending module further comprises the third information, and the codebook-pilot set comprises multiple codebooks, multiple pilot sequences, and a combination relationship between a codebook and a pilot sequence.

Embodiment 24

The apparatus according to embodiment 23, wherein the codebook comprises two or more codewords, the codeword is a multidimensional complex vector and is used to represent a mapping relationship between data and at least two modulation symbols, and the at least two modulation symbols comprise at least one zero modulation symbol and at least one non-zero modulation symbol.

Embodiment 25

The apparatus according to any one of embodiments 22 to 24, wherein the third information comprises an index of the at least one codebook-pilot set.

Embodiment 26

The apparatus according to any one of embodiments 22 to 25, wherein the second information comprises information about a transport block size determined for each transmission area of the M transmission areas; or the second information comprises information about a coding rate determined for each transmission area of the M transmission areas, so that the terminal device determines a transport block size according to a quantity of unit time-frequency resources that are in a transmission area and that can be used to transmit data, a modulation order, and the coding rate.

Embodiment 27

The apparatus according to any one of embodiments 22 to 26, wherein the second information comprises an index of the transport block size determined for each transmission area of the M transmission areas; or the second information comprises an index of the coding rate determined for each transmission area of the M transmission areas.

Embodiment 28

The apparatus according to any one of embodiments 22 to 27, wherein the apparatus further comprises: a receiving module, configured to receive uplink data that is sent by the terminal device on N transmission areas according to transport block sizes of the N transmission areas, wherein N is a positive integer less than or equal to M; and a decoding module, configured to decode the uplink data on the N transmission areas according to the transport block sizes of the N transmission areas.

Embodiment 29

The apparatus according to any one of embodiments 22 to 28, wherein the first information comprises time domain information and frequency domain information of each transmission area of the M transmission areas.

Embodiment 30

The apparatus according to any one of embodiments 22 to 29, wherein the first information comprises a first bit string used to indicate a subframe of a time domain of each transmission area of the M transmission areas and a second bit string used to indicate a resource block of a frequency domain of each transmission area of the M transmission areas.

Embodiment 31

The apparatus according to any one of embodiments 22 to 30, wherein the sending module is specifically configured to: carry the indication message on a broadcast channel, and send, in a broadcast manner, the indication message to all or some of terminal devices served by a network device; or carry the indication message on a dedicated control channel, and send, in a unicast manner, the indication message to one specific terminal device or one specific group of terminal devices served by the network device.

Embodiment 32

The apparatus according to any one of embodiments 22 to 31, wherein the apparatus is a network device.

Embodiment 33

An uplink data transmission apparatus, comprising: a receiving module, configured to receive an indication message sent by a network device, wherein the indication message comprises first information and second information, the first information is used to indicate M transmission areas allocated by the network device, the second information is used to indicate a transport block size of each transmission area of the M transmission areas, M is a positive integer, and the transmission area represents an air interface time-frequency resource that comprises a time range and a frequency range that are specified by a communications system; a first determining module, configured to select N transmission areas from the M transmission areas according to the first information, wherein N is a positive integer less than or equal to M; a second determining module, configured to determine, according to the second information, transport block sizes of the N transmission areas determined by the first determining module; and a sending module, configured to send, on each transmission area of the N transmission areas determined by the first determining module, uplink data to the network device according to the transport block size, which is determined by the second determining module, of each transmission area of the N transmission areas.

Embodiment 34

The apparatus according to embodiment 33, wherein the apparatus further comprises: a third determining module, configured to select one constellation-pilot combination from a preset constellation-pilot set for each transmission area of the N transmission areas, wherein the constellation-pilot set comprises multiple constellation-pilot combinations; and a first generation module, configured to generate an uplink pilot signal according to a pilot sequence in the constellation-pilot combination determined by the third determining module; and the sending module is specifically configured to: generate uplink data on each transmission area of the N transmission areas according to a modulation constellation in the constellation-pilot combination and according to the transport block size of each transmission area of the N transmission areas; and send the uplink pilot and the uplink data to the network device on each transmission area of the N transmission areas.

Embodiment 35

The apparatus according to embodiment 33, wherein the indication message further comprises third information, the third information is used to indicate at least one codebook-pilot set that is determined by the network device for each transmission area of the M transmission areas, and the codebook-pilot set comprises multiple codebooks, pilot sequences, and a combination relationship between a codebook and a pilot sequence; the apparatus further comprises: a fourth determining module, configured to determine at least one codebook-pilot set of each transmission area of the N transmission areas according to the third information; a fifth determining module, configured to select one codebook-pilot combination from the at least one codebook-pilot set for each transmission area of the N transmission areas; and a second generation module, configured to generate an uplink pilot signal according to a pilot sequence in the codebook-pilot combination. The sending module is specifically configured to: generate uplink data on each transmission area of the N transmission areas according to a codebook in the codebook-pilot combination and according to the transport block size of each transmission area of the N transmission areas; and send the uplink pilot and the uplink data to the network device on each transmission area of the N transmission areas.

Embodiment 36

The apparatus according to embodiment 35, wherein the codebook comprises two or more codewords, the codeword is a multidimensional complex vector and is used to represent a mapping relationship between data and at least two modulation symbols, and the at least two modulation symbols comprise at least one zero modulation symbol and at least one non-zero modulation symbol.

Embodiment 37

The apparatus according to embodiment 35 or 36, wherein the third information comprises an index of the at least one codebook-pilot set.

Embodiment 38

The apparatus according to embodiment 34, wherein the constellation-pilot combination meets the following condition: a quantity of unit time-frequency resources that are in a transmission area and that can be used to transmit data*a modulation order of a modulation constellation in a constellation-pilot combination>a transport block size determined for the transmission area.

Embodiment 39

The apparatus according to any one of embodiments 35 to 37, wherein the codebook-pilot combination meets the following condition: a quantity of unit time-frequency resources that are in a transmission area and that can be used to transmit data*a modulation order of a codebook in a codebook-pilot combination>a transport block size determined for the transmission area.

Embodiment 40

The apparatus according to any one of embodiments 33 to 39, wherein the second information comprises information about a coding rate that is determined by the network device for each transmission area of the M transmission areas, and the second determining module is specifically configured to: determine the transport block size of each transmission area of the N transmission areas according to a quantity of unit time-frequency resources that are in each transmission area of the N transmission areas and that can be used to transmit data, a modulation order, and the coding rate.

Embodiment 41

The apparatus according to any one of embodiments 33 to 39, wherein the second information comprises an index of the transport block size determined for each transmission area of the M transmission areas; or the second information comprises an index of a coding rate determined for each transmission area of the M transmission areas.

Embodiment 42

The apparatus according to any one of embodiments 33 to 41, wherein the first information comprises time domain information and frequency domain information of each transmission area of the M transmission areas.

Embodiment 43

The apparatus according to any one of embodiments 33 to 42, wherein the first information comprises a first bit string used to indicate a subframe of a time domain of each transmission area of the M transmission areas and a second bit string used to indicate a resource block of a frequency domain of each transmission area of the M transmission areas.

Embodiment 44

The apparatus according to any one of embodiments 33 to 43, wherein the apparatus is a terminal device.

Embodiment 45

An uplink data transmission apparatus, comprising a processor, a memory, a bus system, and a transceiver, wherein the processor, the memory, and the transceiver are connected by using the bus system, the memory is configured to store an instruction, and the processor is configured to execute the instruction stored in the memory, so as to control the transceiver to send a signal; the processor is configured to: determine M transmission areas allocated to a terminal device, and generate first information used to indicate the M transmission areas, wherein M is a positive integer, the transmission area represents an air interface time-frequency resource that comprises a time range and a frequency range that are specified by a communications system; and determine, for each transmission area of the M transmission areas, second information used to indicate a transport block size; and the transceiver is configured to send an indication message to the terminal device, so that the terminal device transmits uplink data according to the indication message, wherein the indication message comprises the first information and the second information.

Embodiment 46

The apparatus according to embodiment 45, wherein the processor is further configured to: determine at least one codebook-pilot set for each transmission area of the M transmission areas, and generate third information used to indicate the at least one codebook-pilot set, wherein the codebook-pilot set comprises multiple codebooks, multiple pilot sequences, and a combination relationship between a codebook and a pilot sequence, and the indication message sent by the transceiver further comprises the third information.

Embodiment 47

The apparatus according to embodiment 46, wherein the codebook comprises two or more codewords, the codeword is a multidimensional complex vector and is used to represent a mapping relationship between data and at least two modulation symbols, and the at least two modulation symbols comprise at least one zero modulation symbol and at least one non-zero modulation symbol.

Embodiment 48

The apparatus according to any one of embodiments 45 to 47, wherein the third information comprises an index of the at least one codebook-pilot set.

Embodiment 49

The apparatus according to any one of embodiments 45 to 48, wherein the second information comprises information about a transport block size determined for each transmission area of the M transmission areas; or the second information comprises information about a coding rate determined for each transmission area of the M transmission areas, so that the terminal device determines a transport block size according to a quantity of unit time-frequency resources that are in a transmission area and that can be used to transmit data, a modulation order, and the coding rate.

Embodiment 50

The apparatus according to any one of embodiments 45 to 49, wherein the second information comprises an index of the transport block size determined for each transmission area of the M transmission areas; or the second information comprises an index of the coding rate determined for each transmission area of the M transmission areas.

Embodiment 51

The apparatus according to any one of embodiments 45 to 50, wherein the transceiver is further configured to: receive uplink data that is sent by the terminal device on N transmission areas according to transport block sizes of the N transmission areas, wherein N is a positive integer less than or equal to M; and the processor is further configured to: decode the uplink data on the N transmission areas according to the transport block sizes of the N transmission areas.

Embodiment 52

The apparatus according to any one of embodiments 45 to 51, wherein the first information comprises time domain information and frequency domain information of each transmission area of the M transmission areas.

Embodiment 53

The apparatus according to any one of embodiments 45 to 52, wherein the first information comprises a first bit string used to indicate a subframe of a time domain of each transmission area of the M transmission areas and a second bit string used to indicate a resource block of a frequency domain of each transmission area of the M transmission areas.

Embodiment 54

The apparatus according to any one of embodiments 45 to 53, wherein the sending, by the transceiver, an indication message to the terminal device comprises: carrying the indication message on a broadcast channel, and sending, in a broadcast manner, the indication message to all or some of terminal devices served by a network device; or carrying the indication message on a dedicated control channel, and sending, in a unicast manner, the indication message to one specific terminal device or one specific group of terminal devices served by the network device.

Embodiment 55

The apparatus according to any one of embodiments 45 to 54, wherein the apparatus is a network device.

Embodiment 56

An uplink data transmission apparatus, comprising a processor, a memory, a bus system, and a transceiver, wherein the processor, the memory, and the transceiver are connected by using the bus system, the memory is configured to store an instruction, and the processor is configured to execute the instruction stored in the memory, so as to control the transceiver to send a signal; the transceiver is configured to: receive an indication message sent by a network device, wherein the indication message comprises first information and second information, the first information is used to indicate M transmission areas allocated by the network device, the second information is used to indicate a transport block size of each transmission area of the M transmission areas, M is a positive integer, and the transmission area represents an air interface time-frequency resource that comprises a time range and a frequency range that are specified by a communications system; the processor is configured to: select N transmission areas from the M transmission areas according to the first information, wherein N is a positive integer less than or equal to M; and determine a transport block size of each transmission area of the N transmission areas according to the second information; and the transceiver is further configured to: send, on each transmission area of the N transmission areas, uplink data to the network device according to the transport block size of each transmission area of the N transmission areas.

Embodiment 57

The apparatus according to embodiment 56, wherein the processor is further configured to: select one constellation-pilot combination from a preset constellation-pilot set for each transmission area of the N transmission areas, wherein the constellation-pilot set comprises multiple constellation-pilot combinations; and generate an uplink pilot signal according to a pilot sequence in the constellation-pilot combination; and the sending, by the transceiver on each transmission area of the N transmission areas, uplink data to the network device according to the transport block size of each transmission area of the N transmission areas comprises: generating the uplink data on each transmission area of the N transmission areas according to a modulation constellation in the constellation-pilot combination and according to the transport block size of each transmission area of the N transmission areas; and sending the uplink pilot and the uplink data to the network device on each transmission area of the N transmission areas. Embodiment 58. The apparatus according to embodiment 56, wherein the indication message further comprises third information, the third information is used to indicate at least one codebook-pilot set that is determined by the network device for each transmission area of the M transmission areas, and the codebook-pilot set comprises multiple codebooks, pilot sequences, and a combination relationship between a codebook and a pilot sequence; the processor is further configured to: determine at least one codebook-pilot set of each transmission area of the N transmission areas according to the third information; select one codebook-pilot combination from the at least one codebook-pilot set for each transmission area of the N transmission areas; and generate an uplink pilot signal according to a pilot sequence in the codebook-pilot combination; and the sending, by the transceiver on each transmission area of the N transmission areas, uplink data to the network device according to the transport block size of each transmission area of the N transmission areas comprises: generating the uplink data on each transmission area of the N transmission areas according to a codebook in the codebook-pilot combination and according to the transport block size of each transmission area of the N transmission areas; and sending the uplink pilot and the uplink data to the network device on each transmission area of the N transmission areas.

Embodiment 59

The apparatus according to embodiment 58, wherein the codebook comprises two or more codewords, the codeword is a multidimensional complex vector and is used to represent a mapping relationship between data and at least two modulation symbols, and the at least two modulation symbols comprise at least one zero modulation symbol and at least one non-zero modulation symbol.

Embodiment 60

The apparatus according to embodiment 58 or 59, wherein the third information comprises an index of the at least one codebook-pilot set.

Embodiment 61

The apparatus according to embodiment 57, wherein the constellation-pilot combination meets the following condition: a quantity of unit time-frequency resources that are in a transmission area and that can be used to transmit data*a modulation order of a modulation constellation in a constellation-pilot combination>a transport block size determined for the transmission area.

Embodiment 62

The apparatus according to embodiment 58 or 60, wherein the codebook-pilot combination meets the following condition: a quantity of unit time-frequency resources that are in a transmission area and that can be used to transmit data*a modulation order of a codebook in a codebook-pilot combination>a transport block size determined for the transmission area.

Embodiment 63

The apparatus according to any one of embodiments 56 to 62, wherein the second information comprises information about a transport block size that is determined by the network device for each transmission area of the M transmission areas; or the second information comprises information about a coding rate that is determined by the network device for each transmission area of the M transmission areas, and the determining, by the processor, a transport block size of each transmission area of the N transmission areas according to the second information comprises: determining the transport block size of each transmission area of the N transmission areas according to a quantity of unit time-frequency resources that are in each transmission area of the N transmission areas and that can be used to transmit data, a modulation order, and the coding rate.

Embodiment 64

The apparatus according to any one of embodiments 58 to 62, wherein the second information comprises an index of the transport block size determined for each transmission area of the M transmission areas; or the second information comprises an index of a coding rate determined for each transmission area of the M transmission areas.

Embodiment 65

The apparatus according to any one of embodiments 56 to 64, wherein the first information comprises time domain information and frequency domain information of each transmission area of the M transmission areas.

Embodiment 66

The apparatus according to any one of embodiments 56 to 65, wherein the first information comprises a first bit string used to indicate a subframe of a time domain of each transmission area of the M transmission areas and a second bit string used to indicate a resource block of a frequency domain of each transmission area of the M transmission areas.

Embodiment 67

The apparatus according to any one of embodiments 56 to 66, wherein the apparatus is a terminal device.

What is claimed is:

1. A method, comprising:
generating first information indicating M transmission areas allocated to a terminal device, wherein M is a positive integer, and each transmission area of the M transmission areas represents a time-frequency resource, wherein the first information comprises time domain information and frequency domain information of each transmission area of the M transmission areas, and the time domain information of each transmission area of the M transmission areas comprises a time domain assignment, a time domain period, and a time domain offset;
generating, for each transmission area of the M transmission areas, second information indicating a coding rate used for determining a transport block size; and
sending an indication message to the terminal device, wherein the indication message comprises the first information and the second information.

2. The method according to claim 1, wherein the second information comprises an index of the coding rate determined for each transmission area of the M transmission areas.

3. The method according to claim 1, further comprising:
receiving uplink data that is sent by the terminal device on N transmission areas among the M transmission areas, wherein N is a positive integer less than or equal to M; and
decoding the uplink data on the N transmission areas according to transport block sizes of the N transmission areas, wherein each of the transport block sizes of the N transmission areas is determined according to the coding rate determined for a corresponding transmission area of the N transmission areas.

4. The method according to claim 1, wherein the first information comprises a bit string indicating a resource block of a frequency domain of each transmission area of the M transmission areas.

5. The method according to claim 1, wherein sending the indication message to the terminal device comprises:
carrying the indication message on a broadcast channel, and sending, in a broadcast manner, the indication message to all or some of terminal devices served by a network device; or
carrying the indication message on a dedicated control channel, and sending, in a unicast manner, the indication message to one specific terminal device or one specific group of terminal devices served by the network device.

6. An apparatus, comprising:
a processor;
a non-transitory memory;
a bus system; and
a transceiver;
wherein the processor, the non-transitory memory, and the transceiver are connected by using the bus system, the non-transitory memory is configured to store instructions, and the processor is configured to execute the instructions stored in the non-transitory memory, to control the transceiver to transmit and/or receive; and
wherein the processor is further configured to execute the instructions to:
generate first information indicating M transmission areas allocated to a terminal device, wherein M is a positive integer, and each transmission area of the M transmission areas represents a time-frequency resource, wherein the first information comprises time domain information and frequency domain information of each transmission area of the M transmission areas, where the time domain information of each transmission area of the M transmission areas comprises a time domain assignment, a time domain period, and a time domain offset; and
generate, for each transmission area of the M transmission areas, second information indicating a coding rate used for determined a transport block size; and
wherein the transceiver is configured to send an indication message to the terminal device, wherein the indication message comprises the first information and the second information.

7. The apparatus according to claim 6, wherein the processor is further configured to:
determine a codebook-pilot set for each transmission area of the M transmission areas, and generate third information indicating the codebook-pilot set, wherein the codebook-pilot set comprises multiple codebooks, multiple pilot sequences, and a combination relationship between a codebook and a pilot sequence; and
wherein the indication message sent by the transceiver further comprises the third information.

8. The apparatus according to claim 7, wherein each codebook comprises two or more codewords, and each codeword is a multidimensional complex vector and represents a mapping relationship between data and a plurality of modulation symbols, and the plurality of modulation symbols comprises a zero modulation symbol and a non-zero modulation symbol.

9. The apparatus according to claim 7, wherein the third information comprises an index of the codebook-pilot set.

10. The apparatus according to claim 6, wherein the second information comprises an index of the coding rate determined for each transmission area of the M transmission areas.

11. The apparatus according to claim 6, wherein the transceiver is further configured to:
receive uplink data that is sent by the terminal device on N transmission areas among the M transmission areas, wherein N is a positive integer less than or equal to M; and
wherein the processor is further configured to decode the uplink data on the N transmission areas according to transport block sizes of the N transmission areas, wherein each of the transport block sizes of the N transmission areas is determined according to the coding rate determined by the apparatus for a corresponding transmission area of the N transmission areas.

12. The apparatus according to claim 6, wherein the first information comprises a bit string indicating a resource block of a frequency domain of each transmission area of the M transmission areas.

13. The apparatus according to claim 6, wherein sending, by the transceiver, the indication message to the terminal device comprises:

carrying the indication message on a broadcast channel, and sending, in a broadcast manner, the indication message to all or some of terminal devices served by a network device; or carrying the indication message on a dedicated control channel, and sending, in a unicast manner, the indication message to one specific terminal device or one specific group of terminal devices served by the network device.

14. An apparatus, comprising:
a processor;
a non-transitory memory;
a bus system; and
a transceiver;
wherein the processor, the non-transitory memory, and the transceiver are connected using the bus system, the non-transitory memory is configured to store instructions, and the processor is configured to execute the instructions stored in the non-transitory memory, to control the transceiver to transmit and/or receive;
wherein the transceiver is configured to:
receive an indication message sent by a network device, wherein the indication message comprises first information and second information, the first information indicates M transmission areas allocated by the network device to a terminal device, the second information comprises a coding rate assigned for each transmission area of the M transmission areas, M is a positive integer, and each transmission area represents a time-frequency resource, wherein the first information comprises time domain information and frequency domain information of each transmission area of the M transmission areas, and wherein the time domain information of each transmission area of the M transmission areas comprises a time domain assignment, a time domain period, and a time domain offset;
wherein the processor is further configured to:
determine N transmission areas according to the first information, wherein N is a positive integer less than or equal to M; and
determine a transport block size of each transmission area of the N transmission areas according to the second information; and
wherein the transceiver is further configured to:
send, on each transmission area of the N transmission areas, uplink data to the network device according to the transport block size of each transmission area of the N transmission areas.

15. The apparatus according to claim 14, wherein the processor is further configured to:
select one constellation-pilot combination from a preset constellation-pilot set for each transmission area of the N transmission areas, wherein the preset constellation-pilot set comprises multiple constellation-pilot combinations; and
generate an uplink pilot signal according to a pilot sequence in the constellation-pilot combination;
wherein sending, by the transceiver on each transmission area of the N transmission areas, uplink data to the network device according to the transport block size of each transmission area of the N transmission areas comprises:
generating the uplink data on each transmission area of the N transmission areas according to a modulation constellation in the constellation-pilot combination and according to the transport block size of each transmission area of the N transmission areas; and
sending the uplink pilot signal and the uplink data to the network device on each transmission area of the N transmission areas.

16. The apparatus according to claim 15, wherein the one constellation-pilot combination meets the following condition:
a quantity of unit time-frequency resources that are in a transmission area and that can be used to transmit data * a modulation order of a modulation constellation in a constellation-pilot combination>a transport block size determined for the transmission area.

17. The apparatus according to claim 14, wherein the indication message further comprises third information, the third information indicates a codebook-pilot set that is determined by the network device for each transmission area of the M transmission areas, and the codebook-pilot set comprises multiple codebooks, pilot sequences, and a combination relationship between a codebook and a pilot sequence;
wherein the processor is further configured to:
determine a codebook-pilot set of each transmission area of the N transmission areas according to the third information;
select one codebook-pilot combination from the codebook-pilot set for each transmission area of the N transmission areas; and
generate an uplink pilot signal according to a pilot sequence in the codebook-pilot combination; and
wherein sending, by the transceiver on each transmission area of the N transmission areas, uplink data to the network device according to the transport block size of each transmission area of the N transmission areas comprises:
generating the uplink data on each transmission area of the N transmission areas according to a codebook in the codebook-pilot combination and according to the transport block size of each transmission area of the N transmission areas; and
sending the uplink pilot signal and the uplink data to the network device on each transmission area of the N transmission areas.

18. The apparatus according to claim 17, wherein each codebook comprises two or more codewords, each codeword is a multidimensional complex vector and represents a mapping relationship between data and a plurality of modulation symbols, and the plurality of modulation symbols comprise a zero modulation symbol and a non-zero modulation symbol.

19. The apparatus according to claim 17, wherein the third information comprises an index of the codebook-pilot set.

20. The apparatus according to claim 17, wherein the codebook-pilot combination meets the following condition:
a quantity of unit time-frequency resources that are in a transmission area and that can be used to transmit data * a modulation order of a codebook in a codebook-pilot combination>a transport block size determined for the transmission area.

21. The apparatus according to claim 14,
wherein determining, by the processor, a transport block size of each transmission area of the N transmission areas according to the second information comprises:
determining the transport block size of each transmission area of the N transmission areas according to a quantity of unit time-frequency resources that are in each transmission area of the N transmission areas and that can be used to transmit data, a modulation order, and the coding rate.

22. The apparatus according to claim 21, wherein the second information comprises an index of a coding rate determined for each transmission area of the M transmission areas.

23. The apparatus according to claim 14, wherein the first information comprises a first bit string indicating a subframe of a time domain of each transmission area of the M transmission areas and a second bit string indicating a resource block of a frequency domain of each transmission area of the M transmission areas.

24. The method according to claim 1, wherein the M transmission areas are used for non-grant-mode uplink transmission, and wherein uplink data is transmitted by using, without a grant from a network device, a transmission area among the M transmission areas.

25. The apparatus according to claim 6, wherein the M transmission areas are used for non-grant-mode uplink transmission, and wherein uplink data is transmitted by using, without a grant from the apparatus, a transmission area among the M transmission areas.

26. The apparatus according to claim 14, wherein the M transmission areas are used for non-grant-mode uplink transmission, and wherein uplink data is transmitted by using, without a grant from the network device, a transmission area among the M transmission areas.

\* \* \* \* \*